US011981126B2

(12) United States Patent
Kondo

(10) Patent No.: US 11,981,126 B2
(45) Date of Patent: May 14, 2024

(54) INK RIBBON SUPPORT CASSETTE, PRINTING DEVICE, AND REMOVING METHOD

(71) Applicant: Brother Kogyo Kabushiki Kaisha, Nagoya (JP)

(72) Inventor: Kei Kondo, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/162,187

(22) Filed: Jan. 31, 2023

(65) Prior Publication Data

US 2023/0166542 A1 Jun. 1, 2023

Related U.S. Application Data

(63) Continuation of application No. PCT/JP2021/027657, filed on Jul. 27, 2021.

(30) Foreign Application Priority Data

Jul. 31, 2020 (JP) ................................ 2020-131149

(51) Int. Cl.
*B41J 15/04* (2006.01)
*B41J 17/02* (2006.01)
*B41J 17/32* (2006.01)

(52) U.S. Cl.
CPC ............ *B41J 15/044* (2013.01); *B41J 17/02* (2013.01); *B41J 17/32* (2013.01)

(58) Field of Classification Search
None
See application file for complete search history.

(56) References Cited

U.S. PATENT DOCUMENTS 6,357,687 B1 * 3/2002 Liu .................... A47K 10/3836 242/422.4
7,931,229 B2 * 4/2011 Genta .................. B65H 75/242 279/2.19

(Continued)

FOREIGN PATENT DOCUMENTS

JP S48-033134 A 5/1973
JP S61-132366 U 8/1986

(Continued)

OTHER PUBLICATIONS

Jan. 31, 2023—(WO) IPRP—App PCT/JP2021/027657.
Sep. 2021—International Search Report—Intl App PCT/JP2021/027657.

*Primary Examiner* — Matthew G Marini
(74) *Attorney, Agent, or Firm* — Banner & Witcoff, Ltd.

(57) ABSTRACT

An ink ribbon support cassette includes a plate, a shaft extending from the plate, a rotational body provided to be movable along the shaft between a first position and a second position that is farther separated from the plate than is the first position, and a support member switchable between a support state where at least a part of the support member is located outward, in a radial direction of the shaft, than an outer surface of the rotational body in a case where the rotational body is at the first position, and a separation state where the at least a part is located inward in the radial direction with respect than the outer surface of the rotational body in a state where the rotational body is at the second position, the support member being provided on the rotational body.

9 Claims, 12 Drawing Sheets

(56) References Cited

U.S. PATENT DOCUMENTS

| | | | | |
|---|---|---|---|---|
| 8,029,201 | B2 * | 10/2011 | Chen | B41J 33/14 242/573.7 |
| 8,844,859 | B2 | 9/2014 | Deonarine | |
| 2012/0280077 | A1 * | 11/2012 | Deonarine | B41J 33/003 242/538 |

FOREIGN PATENT DOCUMENTS

| | | | |
|---|---|---|---|
| JP | H09-020042 | A | 1/1997 |
| JP | 2005-205740 | A | 8/2005 |
| JP | 2012-062192 | A | 3/2012 |

* cited by examiner

FIG. 8B
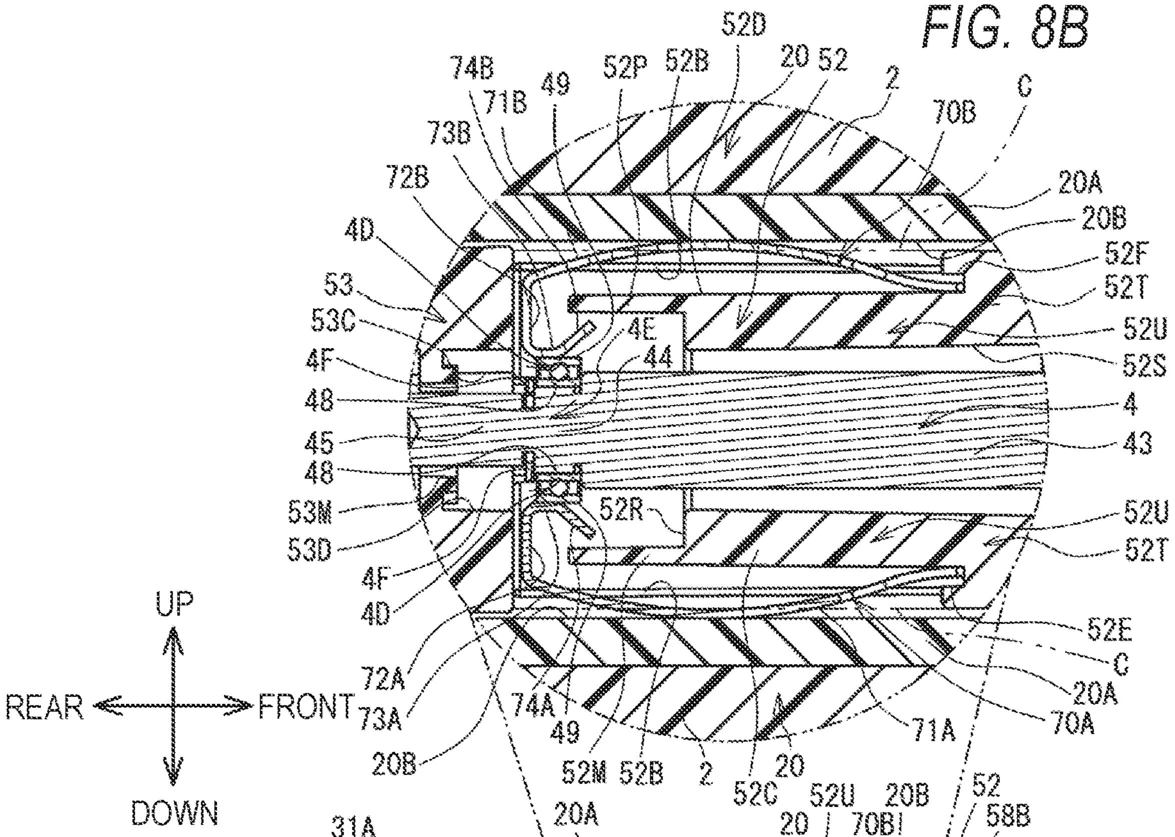
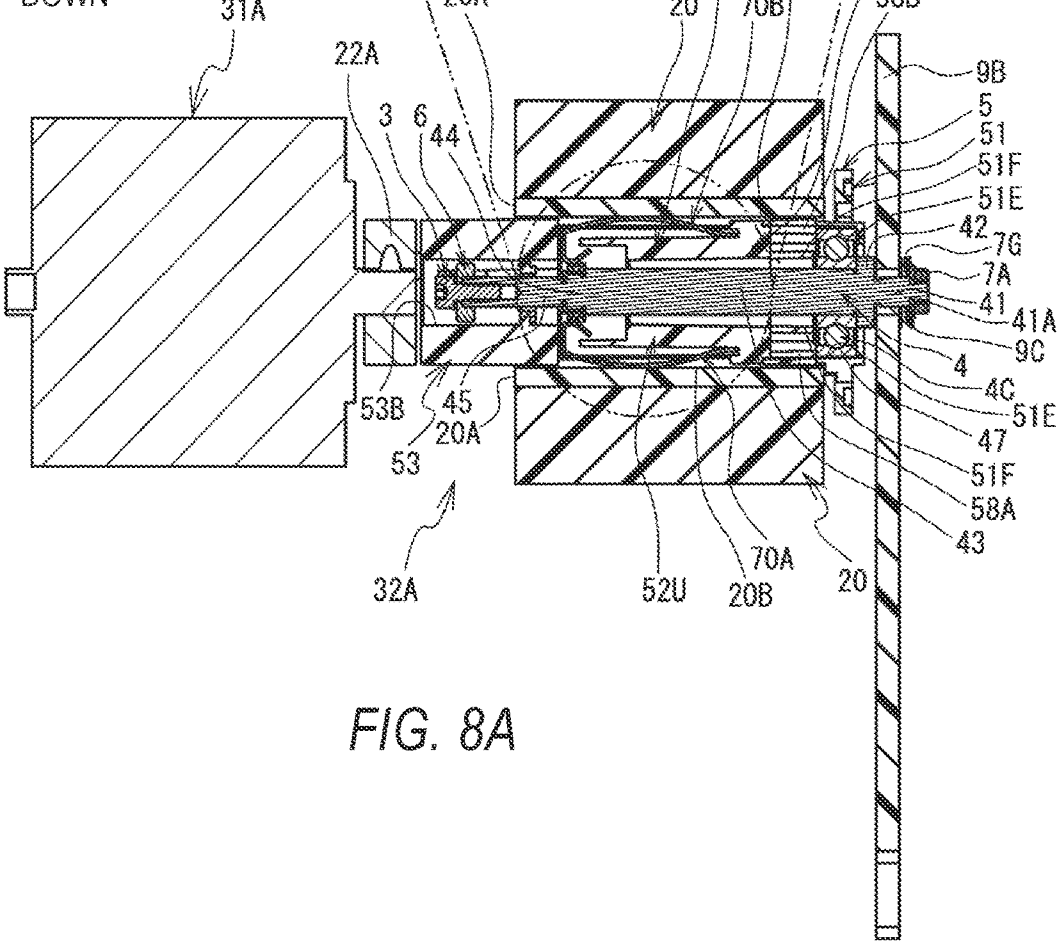
FIG. 8A

FIG. 10B
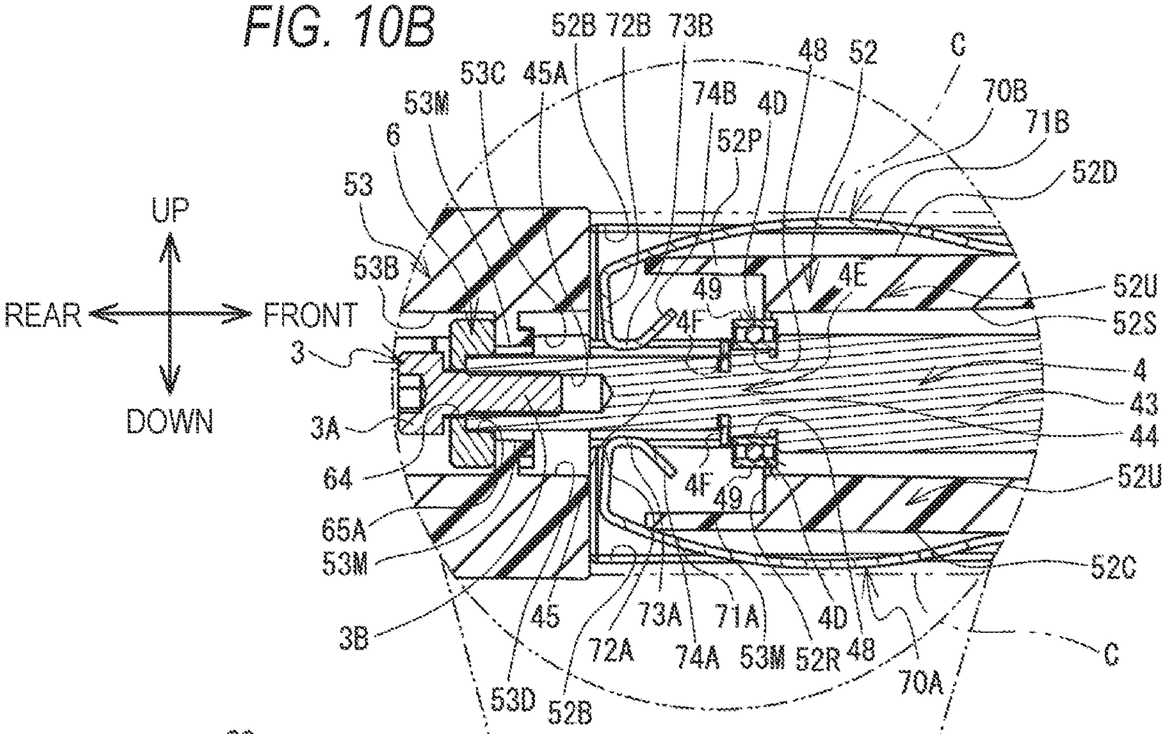
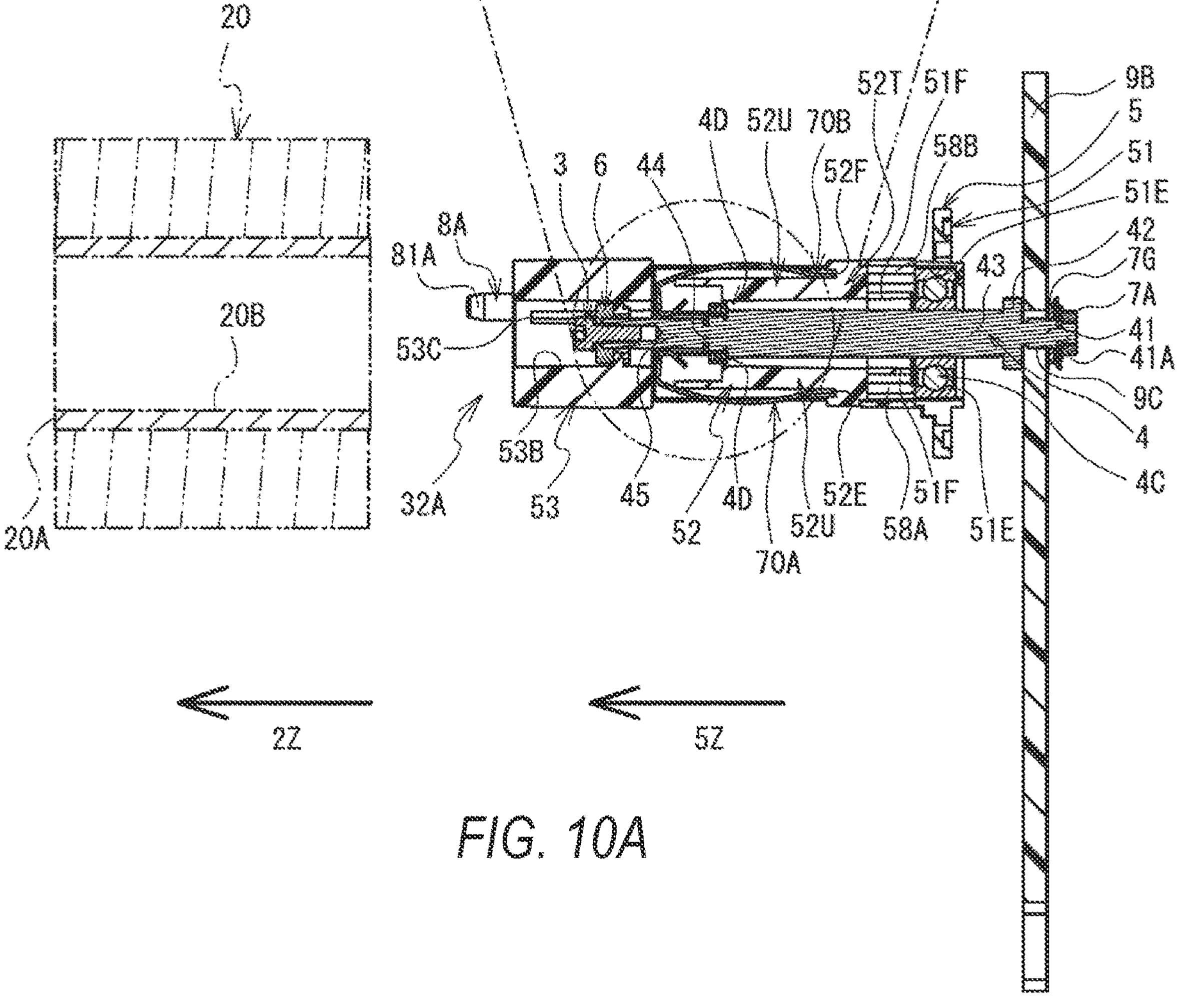
FIG. 10A

INK RIBBON SUPPORT CASSETTE, PRINTING DEVICE, AND REMOVING METHOD

REFERENCE TO RELATED APPLICATIONS

This is a continuation application of International Application No. PCT/JP2021/027657 filed on Jul. 27, 2021 which claims priority from Japanese Patent Application No. 2020-131149 filed on Jul. 31, 2020. The entire contents of the earlier applications are incorporated herein by reference.

BACKGROUND ART

In a holding shaft described in a related art, a hollow body portion of a drum body is mounted on and removed from a free end of a cantilever shaft. The holding shaft includes an outer tube having a rotation mechanism, and an operation shaft that is parallel to and inside the outer tube. The operation shaft is provided with a pair of operating members that come closer to or separate from each other due to rotation of the operation shaft. The outer tube is provided with slide grooves that are through-connected in an axial direction. A slide member including a lower end engaged with the pair of operating members and sliding in a radial direction of the outer tube is mounted to each slide groove. The holding shaft causes the slide member to slide as the operation shaft is rotated, to integrally fix the outer tube and the drum body or release the fixing.

DESCRIPTION

However, in the above holding shaft, in a case of removing the drum body from the holding shaft, a user needs to rotate the operation shaft and then remove the drum body along the axial direction of the outer tube, which is a complicated operation.

An object of the present disclosure is to provide an ink ribbon support cassette from which an ink ribbon is removed with a simpler operation, a printing device that performs printing in a state where the ink ribbon support cassette is mounted, and a method of removing an ink ribbon from the ink ribbon support cassette on which the ink ribbon is mounted.

An aspect of the present disclosure relates to an ink ribbon support cassette capable of being mounted on a printing device configured to perform printing on a printing medium using an ink ribbon, and capable of supporting a ribbon roll having the ink ribbon wound, the ink ribbon support cassette including: a plate; a shaft extending from the plate; a rotational body provided to be rotatable around the shaft by driving of a printing device in a state of being mounted on a printing device, and provided to be movable along the shaft between a first position and a second position that is farther separated from the plate than the first position; and a support member switchable between a support state where at least a part of the support member is located outward, in a radial direction of the shaft, than an outer surface of the rotational body in a case where the rotational body is at the first position, and a separation state where at least the part is located inward in the radial direction than the outer surface of the rotational body in a case where the rotational body is at the second position.

According to the ink ribbon support cassette, support of the ink ribbon by the support member is released by moving the rotational body in a direction away from the plate. The direction of movement of the rotational body for releasing the support of the ink ribbon by the support member coincides with a direction in which the ink ribbon released from the support by the support member is removed. Therefore, the ink ribbon supported by the ink ribbon support cassette can be removed with a simpler operation.

Another aspect of the present disclosure relates to a printing device including: any one of the ink ribbon support cassettes described above; a mounting portion on which the ink ribbon support cassette is capable of being mounted; a drive portion capable of rotating the rotational body of the ink ribbon support cassette mounted on the mounting portion; and a thermal head capable of performing printing on the printing medium by heating the ink ribbon. According to the printing device, the ink ribbon can be removed from the ink ribbon support cassette with a simpler operation. Therefore, the user can more easily replace the ink ribbon supported by the ink ribbon support cassette when performing printing with the printing device.

Still another aspect of the present disclosure relates to a method for removing a ribbon roll from an ink ribbon support cassette. The ink ribbon support cassette includes a shaft extending from a plate, a rotational body provided to be rotatable around the shaft and provided to be movable along the shaft, and configured to be inserted through the ribbon roll having an ink ribbon is wound, and a support member provided on the rotational body, the support member being movable in a radial direction of the shaft in accordance with movement of the rotational body in an axial direction of the shaft, the support member being switchable between a support state where at least a part of the support member is in contact with the ribbon roll from inside to support the ribbon roll and a separation state where at least the part moves inward in the radial direction to be separated from the ribbon roll. The method includes: moving the ribbon roll in a direction away from the plate to move the rotational body along the shaft together with the support member configured to support the ribbon roll; switching the support member from the support state to the separation state in conjunction with the movement of the rotational body in the axial direction to release support of the ribbon roll; and removing the ribbon roll from the rotational body. According to the removing method, the user moves the rotational body in the direction away from the plate, and thus the support of the ink ribbon by the support member is released. The direction of movement of the rotational body for releasing the support of the ink ribbon by the support member coincides with a direction in which the ink ribbon released from the support by the support member is removed. Therefore, the ink ribbon supported by the ink ribbon support cassette can be removed with a simpler operation.

FIG. 5B is an enlarged view of a central rotational body 52.

FIG. 8A is a cross-sectional view of the shaft 32A in a state where the cassette 1B is mounted on the printing device 1A.

FIG. 8B is an enlarged view of a central rotational body 52 in a state where the cassette 1B is mounted on the printing device 1A.

FIG. 10A is an explanatory view showing how a ribbon roll 20 is removed from the shaft 32A.

FIG. 10B is an enlarged view of a central rotational body 52 in a state where a ribbon roll 20 is removed from the shaft 32A.

Figure 1:
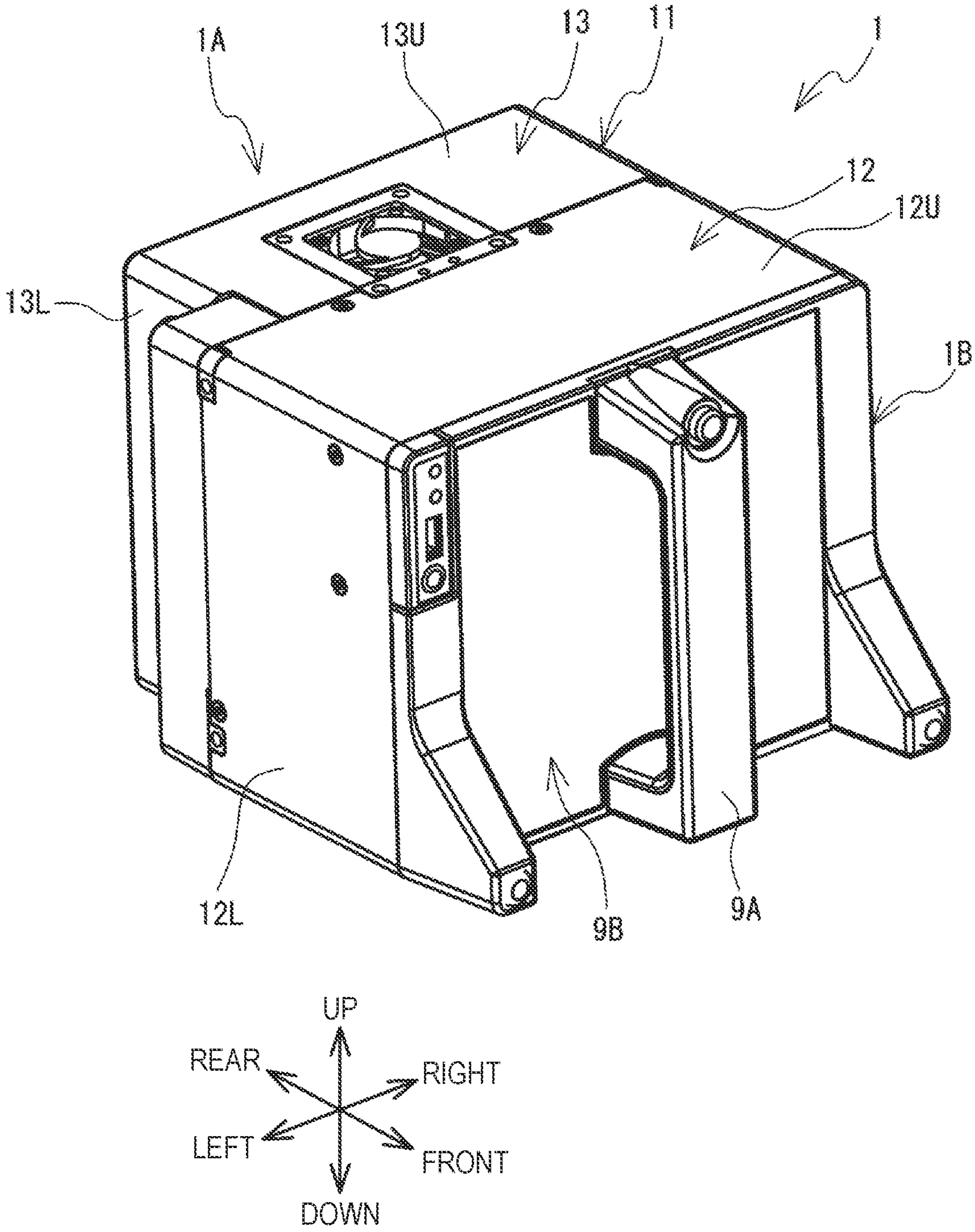
FIG. 1 is a perspective view of a printing device 1A and an ink ribbon support cassette 1B.

An embodiment of the present disclosure will be described with reference to the drawings. A printing device 1A shown in FIG. 1 is a thermal transfer printing device. The printing device 1A performs printing on a printing medium conveyed by an external device that is not shown. An example of the external device is a packaging machine that conveys a packaging material. In this case, for example, the printing device 1A is used by being incorporated in a part of a conveyance line along which the printing medium is conveyed by the packaging machine. An ink ribbon support cassette 1B (hereinafter, referred to as a "cassette 1B") is mounted on the printing device 1A. The printing device 1A performs the printing by feeding out an ink ribbon 2 (see FIG. 4) from the mounted cassette 1B and heating the ink ribbon 2 by a thermal head 26 (see FIG. 2).

Hereinafter, in order to facilitate understanding of the description of the drawings, an upper side, a lower side, a left side, a right side, a front side, and a rear side of the printing device 1A and the cassette 1B are defined. The upper side, the lower side, the left side, the right side, the front side, and the rear side of the printing device 1A and the cassette 1B correspond to an upper side, a lower side, an obliquely upper left side, an obliquely lower right side, an obliquely lower left side, and an obliquely upper right side in FIG. 1, respectively.

<Printing Device 1A>

Figure 2:
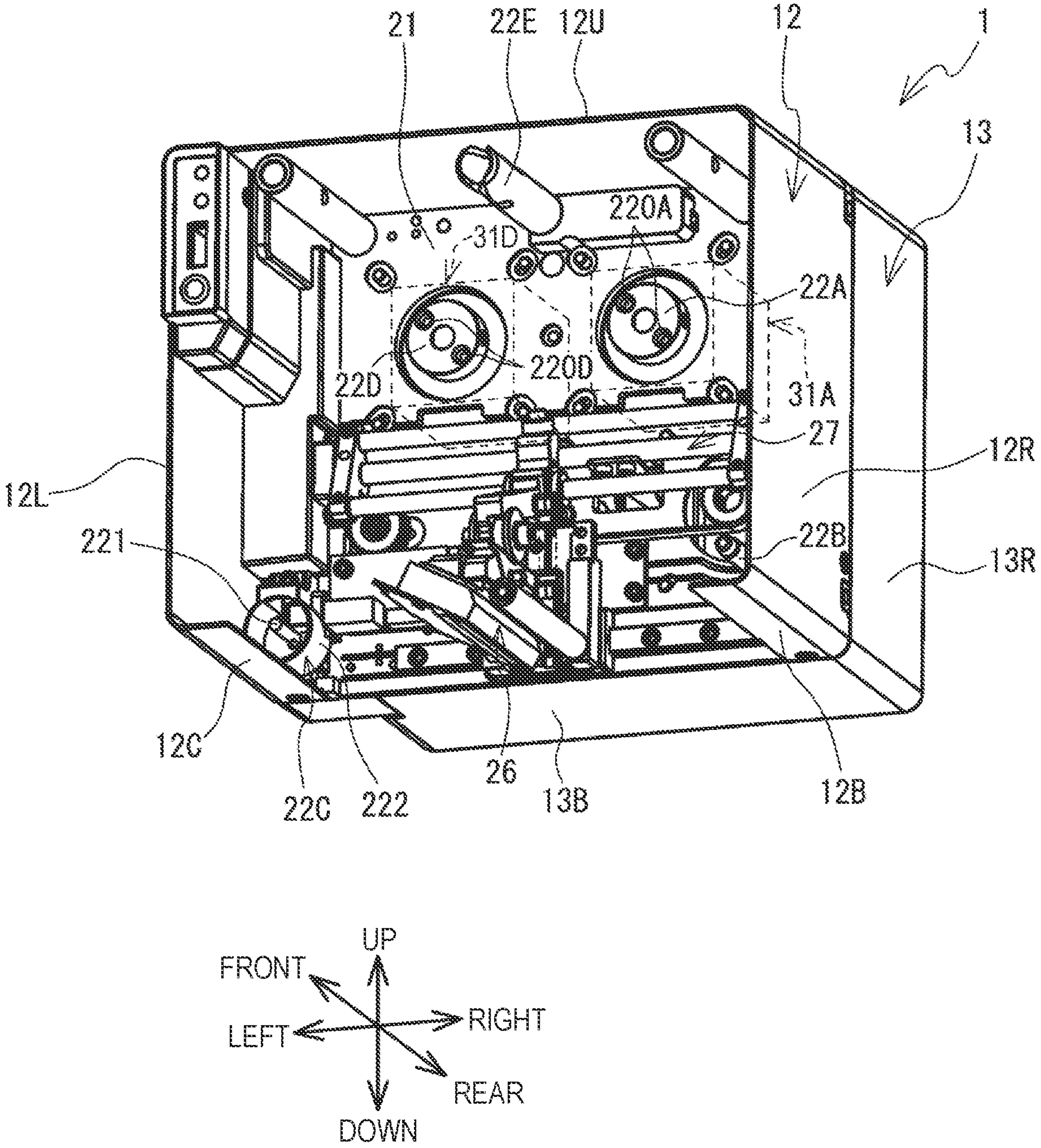
FIG. 2 is a perspective view of the printing device 1A.

As shown in FIG. 1, the printing device 1A has a substantially rectangular parallelepiped shape. The cassette 1B is detachably mounted on the printing device 1A from a front side. The printing device 1A includes a housing 11. The housing 11 includes a front housing 12 and a rear housing 13. The rear housing 13 is provided on a rear side with respect to a base plate 21 (see FIG. 2). As shown in FIGS. 1 and 2, the rear housing 13 includes an upper portion 13U, a bottom portion 13B, and side portions 13R and 13L each having a plate shape. Front ends of the upper portion 13U, the bottom portion 13B, and the side portions 13R and 13L form an opening on a front side of the rear housing 13. The base plate 21 is fitted into the opening of the rear housing 13 from the front side. The rear housing 13 covers motors 31A and 31D (see FIGS. 2 and 3) provided on a rear side of the base plate 21.

Figure 3:
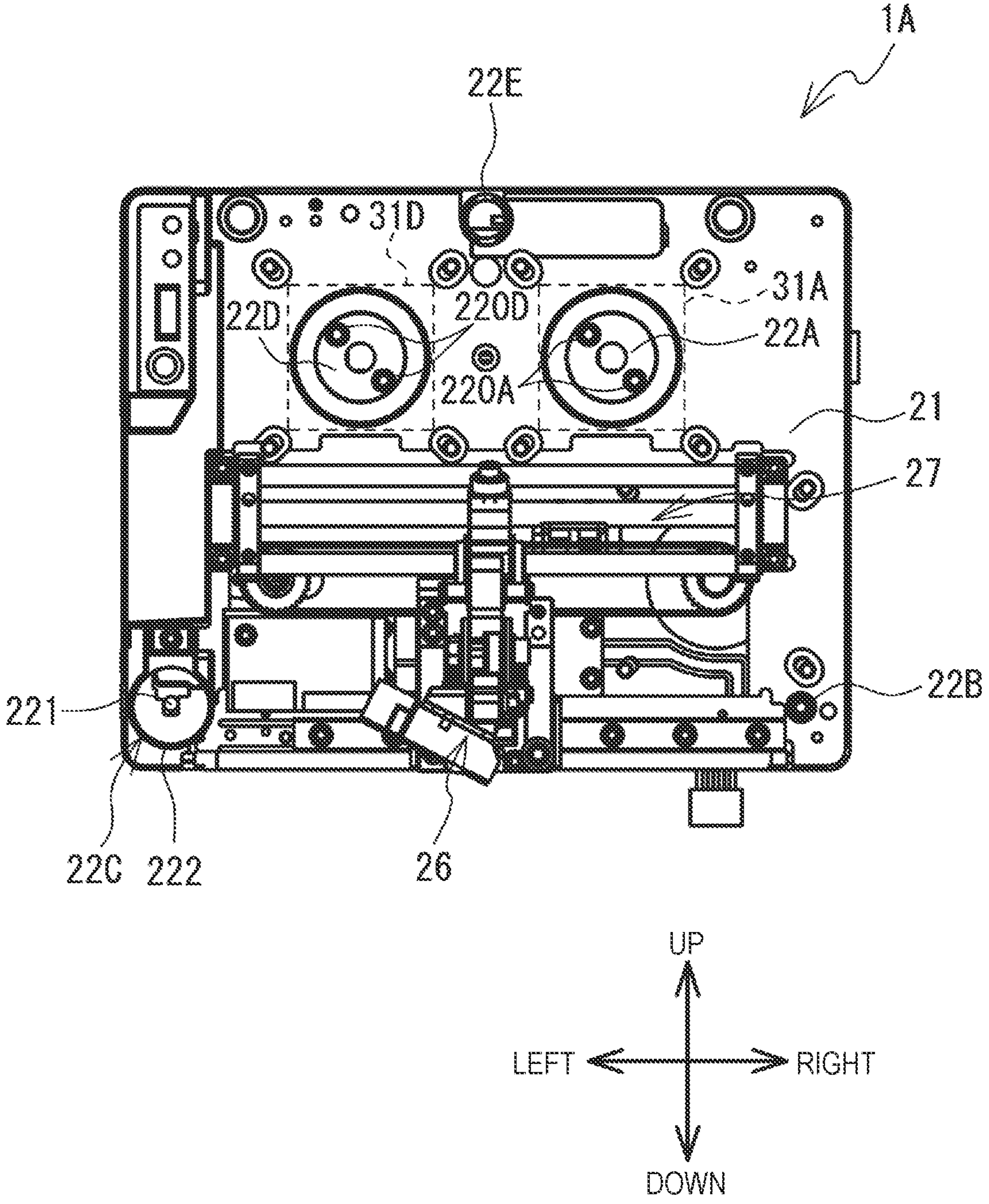
FIG. 3 is a front view of the printing device 1A.

As shown in FIGS. 1 and 2, the front housing 12 includes an upper portion 12U, bottom portions 12B and 12C, and side portions 12R and 12L each having a plate shape. The front housing 12 is connected to a front end of the rear housing 13. The upper portion 12U extends forward from the front end of the upper portion 13U. The bottom portion 12B extends forward from a left front end of the bottom portion 13B. The bottom portion 12C extends forward from a right front end of the bottom portion 13B. The side portions 12R and 12L extend forward from the front ends of the side portions 13R and 13L, respectively. Front ends of the upper portion 12U, the bottom portions 12B and 12C, and the side portions 12R and 12L form an opening on a front side of the front housing 12. A right end of the bottom portion 12B, a left end of the bottom portion 12C, and the front end of the bottom portion 13B of the rear housing 13 form an opening on a lower side of the front housing 12. The thermal head 26 (see FIGS. 2 and 3) is exposed from the opening on the lower side of the front housing 12. In FIGS. 2 and 3, the front housing 12 is omitted.

As shown in FIGS. 2 and 3, the base plate 21 is a substantially rectangular plate. Mounting portions 22A to 22E for mounting the cassette 1B and the thermal head 26 are provided on a front surface of the base plate 21. Hereinafter, when the mounting portions 22A to 22E are not distinguished from each other, the mounting portions 22A to 22E are collectively referred to as a "mounting portion 22".

Shafts 32A to 32E (see FIG. 4) of the cassette 1B can be engaged with the mounting portions 22A to 22E, respectively. The mounting portion 22A is provided on an upper side with respect to a center of the base plate 21 in an up-down direction and on a right side with respect to a center of the base plate 21 in a left-right direction. The mounting portion 22D is provided on the upper side with respect to the center of the base plate 21 in the up-down direction and on a left side with respect to the center of the base plate 21 in the left-right direction. The mounting portions 22A and 22D each have a columnar shape (see FIG. 2), and are arranged in the left-right direction. A pair of holes 220A recessed rearward are formed in a front surface of the mounting portion 22A. A pair of holes 220D recessed rearward are formed in a front surface of the mounting portion 22D. Rotation shafts of the motors 31A and 31D are connected to the mounting portions 22A and 22D from behind, respectively. The mounting portions 22A and 22D rotate in accordance with rotation of the motors 31A and 31D, respectively.

The mounting portion 22B is a columnar rod extending forward from a lower right corner of the base plate 21. The mounting portion 22C includes a guide portion 221 and a guide part 222. The guide part 222 extends forward from a lower left corner of the base plate 21. The guide part 222 has a hole recessed from a front end of the guide part 222 to the base plate 21, and the guide portion 221 is provided inside the hole. The guide portion 221 has a columnar rod shape and extends forward from the base plate 21. The mounting portion 22E is provided on an upper end portion of the base plate 21 and at the center of the base plate 21 in the left-right direction.

The thermal head 26 is provided on a front side of a lower portion of the base plate 21. The thermal head 26 is a line thermal head including a plurality of heating elements linearly arranged in a front-rear direction. The thermal head 26 is movable in the left-right direction and the up-down direction by a moving mechanism 27 provided on the front side of the lower portion of the base plate 21.

<Cassette 1B>

Figure 4:
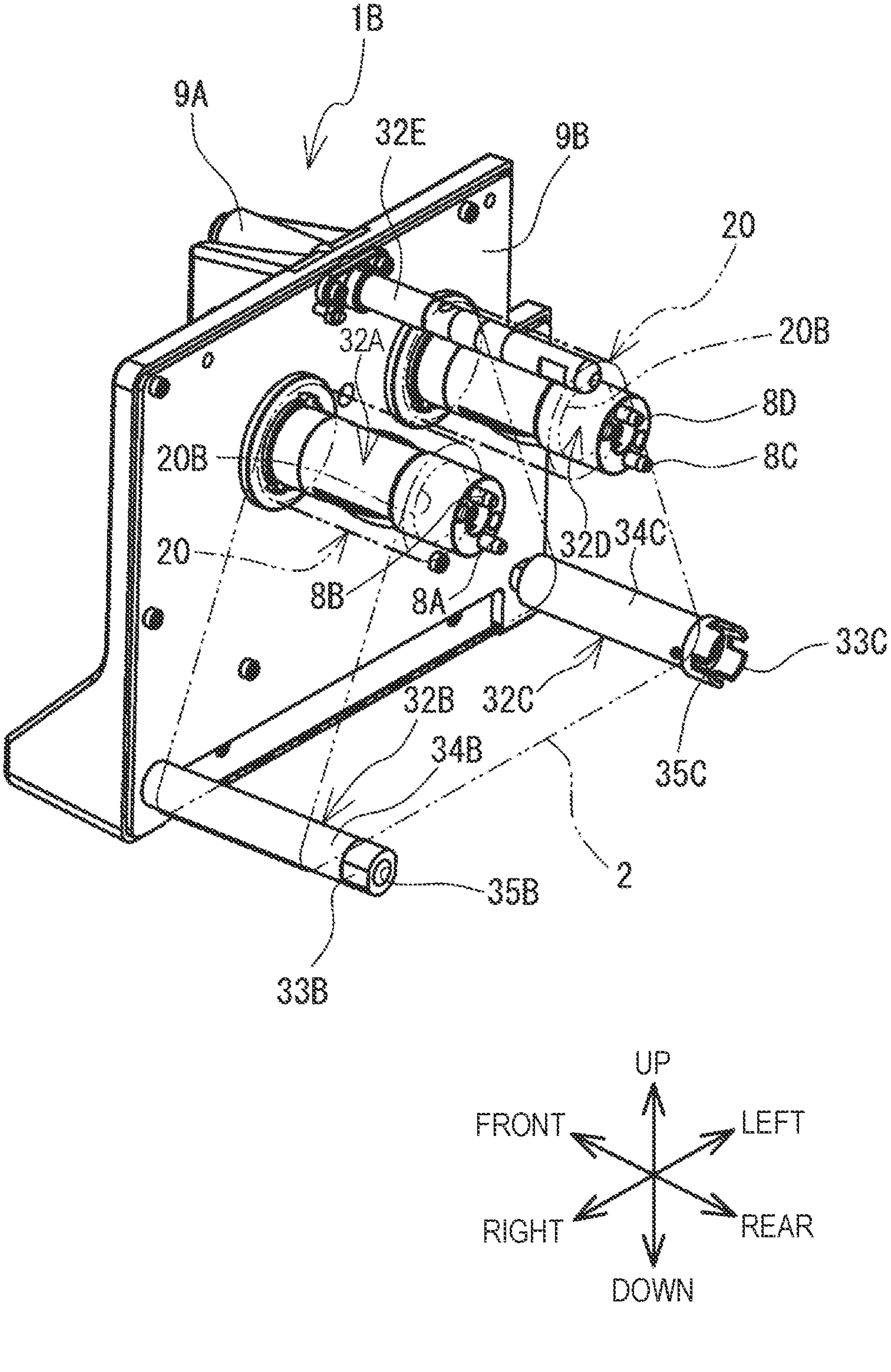
FIG. 4 is a perspective view of the ink ribbon support cassette 1B.

As shown in FIG. 4, the cassette 1B includes a handle 9A, a plate 9B, and the shafts 32A to 32E. The plate 9B is a plate-shaped base portion having a rectangular shape in a front view. The handle 9A is provided at a center of a front surface of the plate 9B in the left-right direction. Each of the shafts 32A to 32E extends rearward from a rear surface of the plate 9B.

The shaft 32A is provided on an upper side with respect to a center of the plate 9B in an up-down direction and on a right side with respect to a center of the plate 9B in the left-right direction. The shaft 32D is provided on the upper side with respect to the center of the plate 9B in the up-down direction and on a left side with respect to the center of the plate 9B in the left-right direction. The shafts 32A and 32D are arranged in the left-right direction. The shafts 32A and 32D have the same configuration.

A cylindrical spool 20A (see FIG. 8A) to which one end of the ink ribbon 2 is connected is mounted on the shaft 32A. The spool 20A is provided with a through hole 20B penetrating in the front-rear direction. The unused ink ribbon 2 is wound in a roll shape around the spool 20A. Hereinafter, the spool 20A and the ink ribbon 2 wound around the spool 20A in a roll shape are referred to as a "ribbon roll 20".

A cylindrical spool to which the other end of the ink ribbon 2 is connected is mounted on the shaft 32D. The ink ribbon 2 extending between the two spools is stretched between the shafts 32B and 32C. In a state where the cassette 1B is mounted on the printing device 1A, engaging rods 8A and 8B disposed on a tip end of the shaft 32A are engaged with the mounting portion 22A (see FIG. 3). Engaging rods 8C and 8D provided on a tip end of the shaft 32D are engaged with the mounting portion 22D (see FIG. 3).

The shaft 32B is provided on a lower right corner of the plate 9B. The shaft 32B includes a shaft 33B and a rotational body 34B. The shaft 33B has a columnar shape and extends rearward from the plate 9B. The rotational body 34B has a cylindrical shape and is held to be rotatable around the shaft 33B. A front surface of the shaft 32B is provided with a hole 35B that is recessed rearward and through which the mounting portion 22B (see FIG. 3) is inserted in a state where the cassette 1B is mounted on the printing device 1A. The shaft 32C is provided on the lower left corner of the plate 9B. A configuration of the shaft 32C is substantially the same as that of the shaft 32B. The shaft 32C includes a shaft 33C and a rotational body 34C. A front surface of the shaft 33C is provided with a hole 35C that is recessed rearward and through which the guide portion 221 (see FIG. 3) of the mounting portion 22C is inserted in a state where the cassette 1B is mounted on the printing device 1A. The shaft 32E is provided on an upper end portion of the plate 9B and at the center of the plate 9B in the left-right direction, and is engaged with the mounting portion 22E (see FIG. 3).

The ink ribbon 2 extending from the spool 20A mounted on the shaft 32A extends to a lower right side toward the shaft 32B, comes into contact with the rotational body 34B of the shaft 32B to change its direction, and extends to a left side toward the shaft 32C. The ink ribbon 2 comes into contact with the rotational body 34C of the shaft 32C to change its direction, and extends to an upper right side toward the spool mounted on the shaft 32D. As the shafts 32A and 32D rotate, the ink ribbon 2 is fed out from the ribbon roll 20 mounted on the shaft 32A, and is wound around the spool mounted on the shaft 32D. In accordance with movement of the ink ribbon 2, the rotational bodies 34B and 34C of the shafts 32B and 32C rotate with respect to the shafts 33B and 33C, respectively.

<Shafts 32A and 32D>

Figure 5A:
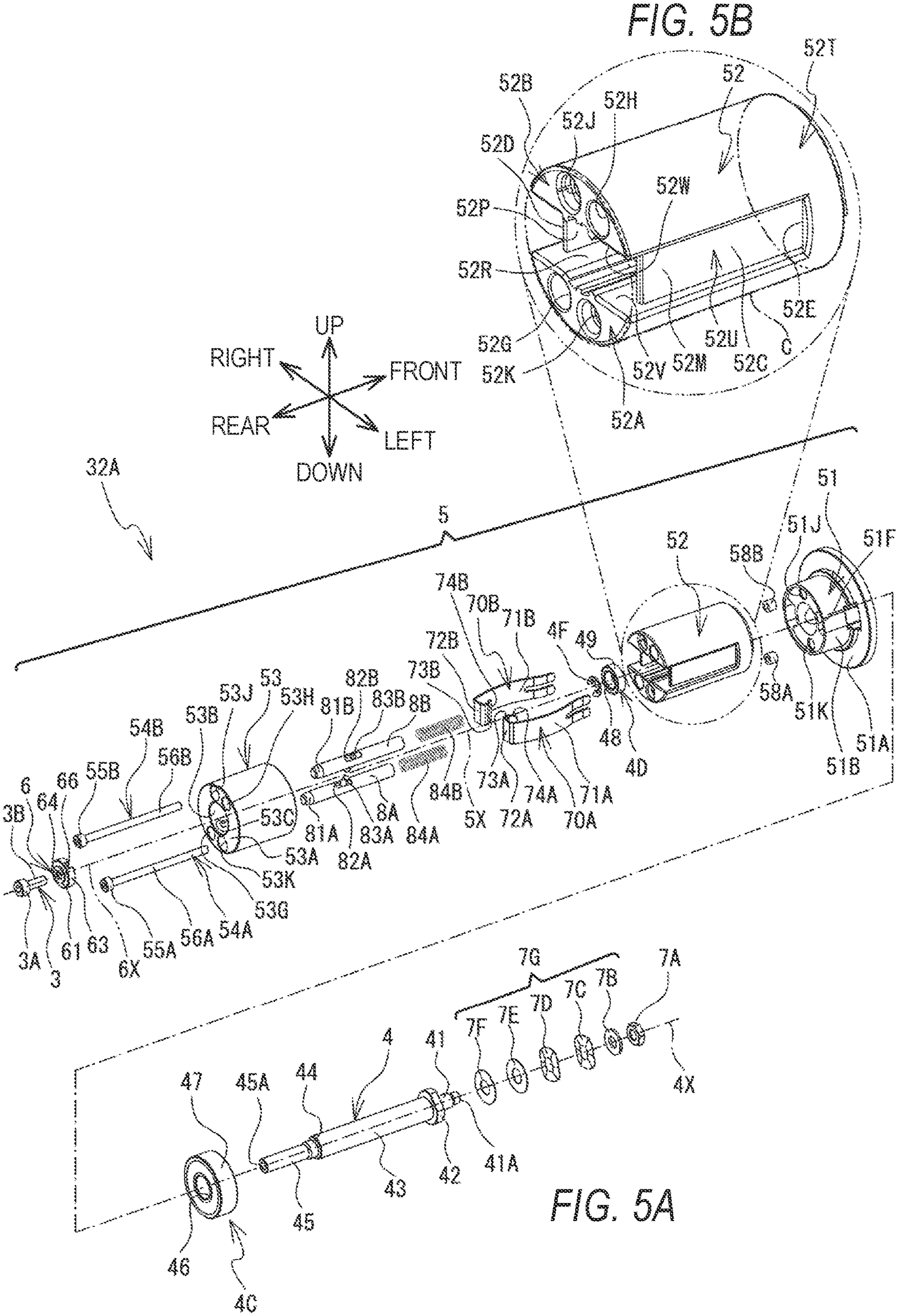
FIG. 5A is an exploded perspective view of a shaft 32A.
Figure 6:
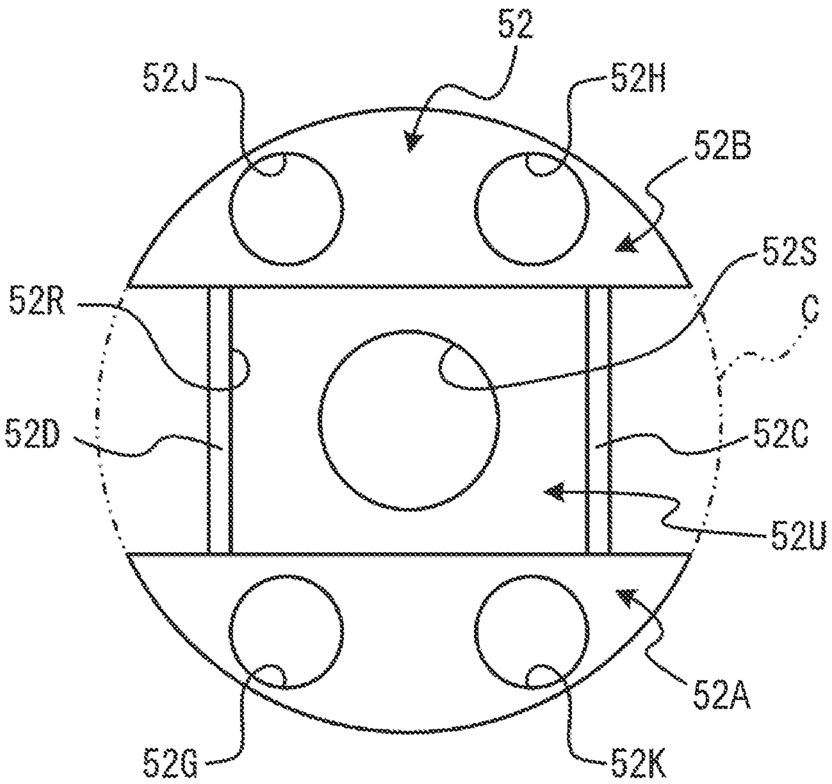
FIG. 6 is a rear view of a central rotational body 52.

The shafts 32A and 32D have the same configuration, and thus the shaft 32A will be specifically described below as an example, and the description of the shaft 32D will be omitted. As shown in FIG. 5A, the shaft 32A includes a shaft 4, a nut 7A, flat washers 7B, 7E, and 7F, wave spring washers 7C and 7D, a column 6, a bolt 3, a rotational body 5, the engaging rods 8A and 8B, coil springs 84A and 84B, and the like.

<Shaft 4>

The shaft 4 is a member that is inserted through the rotational body 5, which will be described later, and serves as a support shaft of the rotational body 5. The shaft 4 is provided in the plate 9B and extends rearward from the rear surface of the plate 9B (see FIG. 8A). The shaft 4 includes an insertion portion 41, a shaft wall portion 42, a front protruding portion 43, a central protruding portion 44, and a rear protruding portion 45. Each of the insertion portion 41, the shaft wall portion 42, the front protruding portion 43, the central protruding portion 44, and the rear protruding portion 45 has a substantially columnar shape extending in the front-rear direction, and has a rotation center extending in the front-rear direction. A rotation center of the shaft 4 is defined as a "rotation center 4X".

The insertion portion 41 is inserted through a through hole 9C (see FIG. 8A) provided in the plate 9B. A screw portion 41A formed with a screw groove is provided on a rear portion of the insertion portion 41. The screw portion 41A protrudes forward from the front surface of the plate 9B and is screwed with the nut 7A. The flat washer 7B, the wave spring washers 7C and 7D, and the flat washers 7E and 7F are provided, in this order from the front, between the plate 9B and the nut 7A such that the insertion portion 41 is inserted through the flat washer 7B, the wave spring washers 7C and 7D, and the flat washers 7E and 7F. Hereinafter, the flat washer 7B, the wave spring washers 7C and 7D, and the flat washers 7E and 7F are collectively referred to as a "washer portion 7G". In short, the washer portion 7G is sandwiched between the front surface of the plate 9B and a rear surface of the nut 7A.

The shaft wall portion 42 is provided at a rear end of the insertion portion 41. A diameter of the shaft wall portion 42 is larger than that of the insertion portion 41, and is larger than that of the through hole 9C. A front surface of the shaft wall portion 42 is in contact with the rear surface of the plate 9B from behind. The plate 9B is sandwiched by the front surface of the shaft wall portion 42, the washer portion 7G, and the nut 7A, and thus movement of the shaft 4 in the front-rear direction with respect to the plate 9B is limited.

The front protruding portion 43 is provided at a rear end of the shaft wall portion 42. A diameter of the front protruding portion 43 is smaller than the diameter of the shaft wall portion 42. As shown in FIG. 5A, the front protruding portion 43 is inserted through an inner ring 46 of a bearing 4C. The inner ring 46 has a cylindrical shape extending in the front-rear direction. The diameter of the front protruding portion 43 is substantially equal to an inner diameter of the inner ring 46.

The central protruding portion 44 is provided at a rear end of the front protruding portion 43. A diameter of the central protruding portion 44 is smaller than the diameter of the front protruding portion 43. A groove recessed inward in a radial direction is formed in a rear end portion of the central protruding portion 44. The central protruding portion 44 is inserted through an inner ring 48 of a bearing 4D and a retaining ring 4F in this order from behind. The inner ring 48 has a cylindrical shape extending in the front-rear direction. The diameter of the central protruding portion 44 is substantially equal to an inner diameter of the inner ring 48. A front surface of the bearing 4D is in contact with a rear surface of the front protruding portion 43. The retaining ring 4F is fitted into and fixed to the groove of the central protruding portion 44. A diameter of the bearing 4D is larger than a diameter of the retaining ring 4F in a state where the diameter of the bearing 4D is inserted through the central protruding portion 44. A rear surface of the bearing 4D is in contact with a front surface of the retaining ring 4F. Movement of the bearing 4D in the front-rear direction is limited by the front protruding portion 43 and the retaining ring 4F. Hereinafter, the central protruding portion 44 inserted through the bearing 4D is referred to as a "bearing portion 4E".

As shown in FIG. 5A, the rear protruding portion 45 is provided at a rear end of the central protruding portion 44. A diameter of the rear protruding portion 45 is smaller than a diameter of the bearing portion 4E. A hole 45A recessed forward is provided in a rear surface of the rear protruding portion 45. The hole 45A has a circular cross-sectional shape, and a screw groove is formed in an inner wall of the hole 45A. The column 6 is in contact with the rear surface of the rear protruding portion 45 from the front. The bolt 3 is screwed into the hole 45A with the column 6 interposed between the bolt 3 and the hole 45A.

<Column 6>

Figure 7:
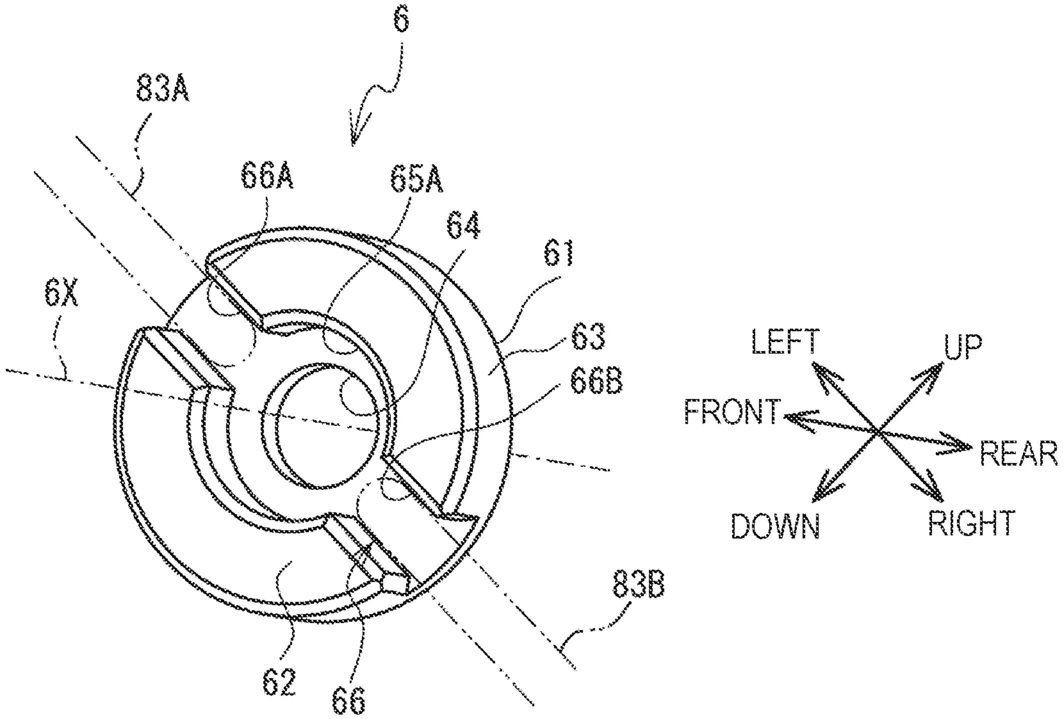
FIG. 7 is a perspective view of a column 6.
Figures 9A, 9B:
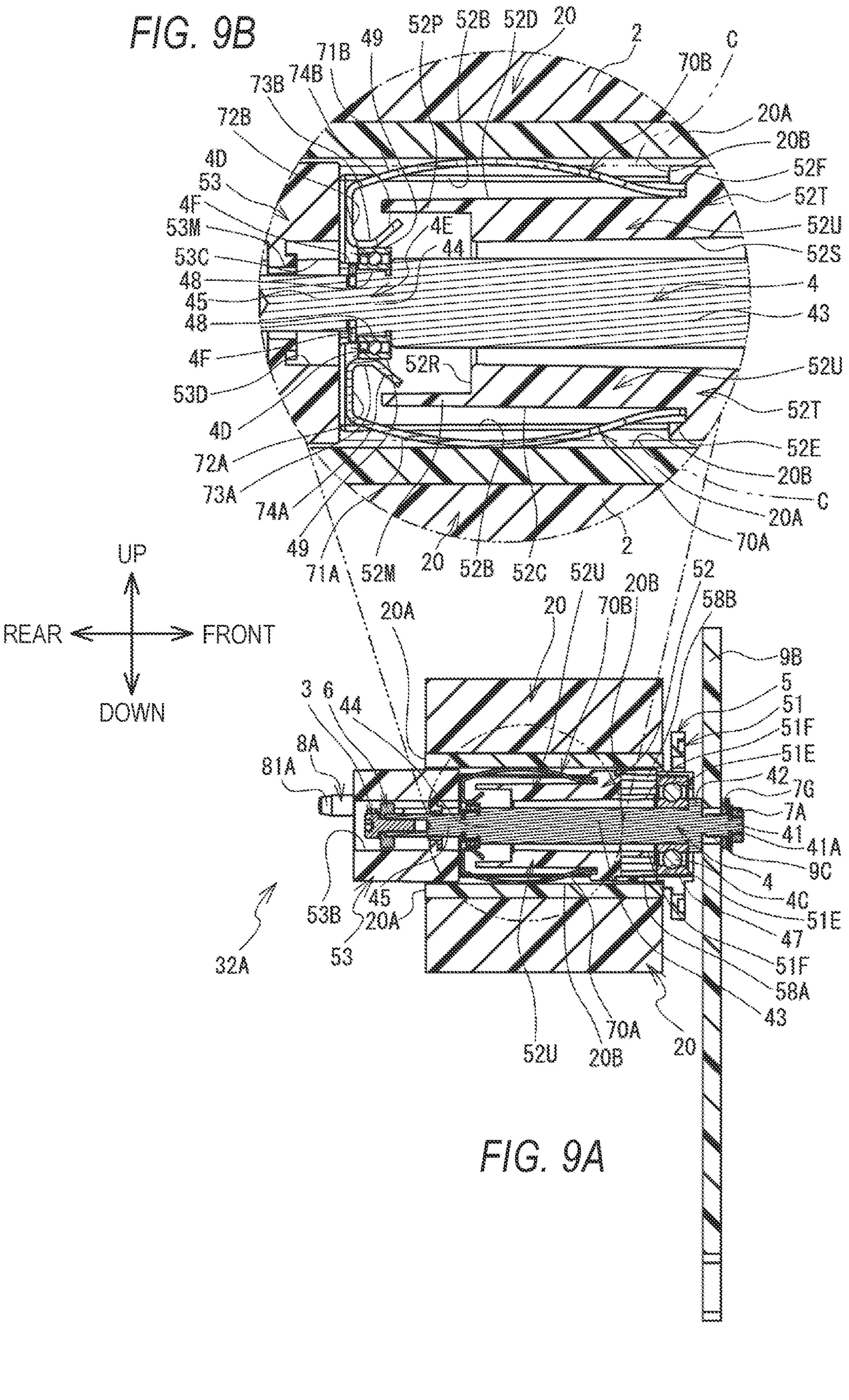
FIG. 9A is a cross-sectional view of the shaft 32A in a state where the cassette 1B is removed from the printing device 1A.
FIG. 9B is an enlarged view of a central rotational body 52 in a state where the cassette 1B is removed from the printing device 1A.

As shown in FIG. 7, the column 6 has a substantially columnar shape. The column 6 includes a rear surface 61, a front surface 62, and a side surface 63. The rear surface 61 and the front surface 62 are bottom surfaces of the column. A head portion 3A of the bolt 3 is in contact with the rear surface 61. A through hole 64 penetrating the column 6 in the front-rear direction is provided at a center of the rear surface 61. A screw portion 3B of the bolt 3 is inserted through the through hole 64. Hereinafter, a virtual axis that passes through a center of the through hole 64 and extends in the front-rear direction is referred to as a "reference axis 6X". The reference axis 6X coincides with the rotation center 4X of the shaft 4 in a state where the bolt 3 is screwed into the hole 45A of the shaft 4 via the column 6.

A groove 65A recessed rearward is formed in a center of the front surface 62. The groove 65A has a circular shape in a front view. A diameter of the groove 65A is larger than a diameter of the through hole 64 and is substantially equal to the diameter of the rear protruding portion 45 of the shaft 4. The column 6 is in contact with the shaft 4 from the front such that the groove 65A and the rear protruding portion 45 are fitted to each other. The bolt 3 inserted through the through hole 64 is screwed into the hole 45A of the rear protruding portion 45, and thus the column 6 is fixed to the shaft 4. Therefore, the column 6 rotates together with the shaft 4 around the rotation center 4X in a state of being fixed to the shaft 4.

Grooves 66A and 66B recessed rearward are further formed in the front surface 62 from an outer peripheral end of the front surface 62 to the groove 65A. The grooves 66A and 66B have the same shape. The grooves 66A and 66B are separated from each other in the left-right direction. The groove 65A is located between the grooves 66A and 66B. In a depth in the front-rear direction, the grooves 65A, 66A, and 66B are substantially equal to each other. A width of each of the grooves 66A and 66B (equal to a length of the side surface 63 in a peripheral direction) is larger than a diameter of each of protrusions 83A and 83B, which will be described later. Hereinafter, when the grooves 66A and 66B are not distinguished from each other, the grooves 66A and 66B are collectively referred to as a "groove 66".

<Rotational Body 5>

The rotational body 5 is provided around the shaft 4. That is, an axial direction of the shaft 4 coincides with an axial direction of the rotational body 5. Similarly, a radial direction of the shaft 4 coincides with a radial direction of the rotational body 5. The rotational body 5 is inserted through the ribbon roll 20. As shown in FIGS. 5A, 5B, 8A, and 8B, the rotational body 5 includes a front rotational body 51, a central rotational body 52, and a rear rotational body 53. The front rotational body 51 includes a flange 51A and a cylindrical portion 51B. A diameter of the flange 51A is larger than a diameter of the spool 20A of the ribbon roll 20. The cylindrical portion 51B is provided at a rear end of the flange 51A. The cylindrical portion 51B has a columnar shape extending in the front-rear direction.

A hole 51E recessed rearward is provided at a center of a front surface of the flange 51A. The hole 51E has a circular cross-sectional shape. A diameter of the hole 51E is substantially equal to a diameter of an outer ring 47 of the bearing 4C. The outer ring 47 has a cylindrical shape extending in the front-rear direction, and is provided outside the inner ring 46. The bearing 4C is fitted into the hole 51E. A through hole 51F penetrating the front rotational body 51 in the front-rear direction is provided at a center of a rear surface of the cylindrical portion 51B. The through hole 51F is connected to the hole 51E. The through hole 51F has a circular cross-sectional shape. A diameter of the through hole 51F is smaller than the diameter of the hole 51E and larger than the diameter of the bearing 4D. The front rotational body 51 is rotatable around an axis of the through hole 51F.

Holes 51J and 51K recessed rearward are provided in the rear surface of the cylindrical portion 51B. The holes 51J and 51K each have a circular cross-sectional shape. The holes 51J and 51K are separated from each other in the up-down direction. The through hole 51F is located between the holes 51J and 51K. Nuts 58A and 58B each formed with a screw hole are embedded in the holes 51J and 51K, respectively.

As shown in FIGS. 5A, 5B, 6, 8A, and 8B, the central rotational body 52 is provided at a rear end of the front rotational body 51. The central rotational body 52 has a substantially columnar shape extending in the front-rear direction. The central rotational body 52 includes a cylindrical portion 52T, arcuate portions 52A and 52B, a prism portion 52U, and protruding portions 52M and 52P. The cylindrical portion 52T configures a front portion of the central rotational body 52. The cylindrical portion 52T has a columnar shape extending in the front-rear direction. A diameter of the cylindrical portion 52T is substantially equal to a diameter of the cylindrical portion 51B of the front rotational body 51. A through hole 52S penetrating the central rotational body 52 in the front-rear direction is provided in a front surface of the cylindrical portion 52T. The through hole 52S has a circular cross-sectional shape. A diameter of the through hole 52S is substantially equal to the diameter of the through hole 51F of the front rotational body 51. An axis of the through hole 52S coincides with the axis of the through hole 51F of the front rotational body 51. The central rotational body 52 is rotatable around the axis of the through hole 52S.

The arcuate portions 52A and 52B are provided at a rear end of the cylindrical portion 52T. Each of the arcuate portions 52A and 52B has an arcuate shape, in a front view, surrounded by an arc and a string in a circle having the same diameter as the diameter of the cylindrical portion 52T. Each of the arcuate portions 52A and 52B extends rearward from the rear end of the cylindrical portion 52T. Side surfaces, of the arcuate portions 52A and 52B, having the string in the arcuate shape are referred to as "string side surfaces 52V and 52W", respectively. The string side surfaces 52V and 52W face each other across the through hole 52S of the cylindrical portion 52T. The arcuate portions 52A and 52B each protrude outward of the cylindrical portion 52T in the radial direction. Outer surfaces of the arcuate portions 52A and 52B are in contact with a virtual column (hereinafter, referred to as a "virtual column C") circumscribing the central rotational body 52. In other words, an outer surface of the virtual column C coincides with an outer surface of the central rotational body 52. That is, the outer surfaces of the arcuate portions 52A and 52B and an outer surface of the cylindrical portion 52T are continuous with each other in the front-rear direction.

The arcuate portion 52A is provided with a through hole 52K penetrating in the front-rear direction and a hole 52G recessed forward from a rear surface of the arcuate portion 52A. The through hole 52K and the hole 52G are arranged in a peripheral direction of the central rotational body 52. The arcuate portion 52B is provided with a through hole 52J penetrating in the front-rear direction and a hole 52H recessed forward from a rear surface of the arcuate portion 52B. The through hole 52J and the hole 52H are arranged in the peripheral direction of the central rotational body 52. The through holes 52J and 52K are provided at positions corresponding to the holes 51J and 51K of the front rotational body 51, respectively. The through holes 52J and 52K are rotationally symmetric with respect to the rotation center 4X. The holes 52G and 52H are rotationally symmetric with respect to the rotation center 4X.

The coil springs 84A and 84B and the engaging rods 8A and 8B are inserted into the holes 52G and 52H in this order from behind, respectively. The coil springs 84A and 84B are each a cylindrical compression coil spring that can expand and contract in the front-rear direction. Front ends of the coil springs 84A and 84B are in contact with front ends of the holes 52G and 52H, respectively. The engaging rods 8A and 8B each have a substantially rod shape extending in the front-rear direction. Front ends of the engaging rods 8A and 8B are in contact with rear ends of the coil springs 84A and 84B, respectively. The engaging rods 8A and 8B are guided by the holes 52G and 52H, respectively, and are movable in the front-rear direction. The engaging rods 8A and 8B partially protrude rearward from the rear surfaces of the arcuate portions 52A and 52B, respectively.

The engaging rod 8A includes a tip end portion 81A, a through hole 82A, and a protrusion 83A. The tip end portion 81A is a rear end portion of the engaging rod 8A, and is formed in a tapered shape in which a diameter of the tapered shape decreases toward the rear. The through hole 82A is provided in a central portion of the engaging rod 8A in a front-rear direction, and penetrates in a radial direction of the central rotational body 52. The radial direction of the central rotational body 52 also coincides with the radial directions of the central rotational body 5 and the shaft 4. The protrusion 83A is a rod that protrudes in the radial direction of the central rotational body 52. The protrusion 83A is fitted into the through hole 82A from an inside of the central rotational body 52 in the radial direction. The protrusion 83A fitted into the through hole 82A protrudes inward of the central rotational body 52 in the radial direction from a side surface of the engaging rod 8A.

The prism portion 52U extends in the front-rear direction from the rear end of the cylindrical portion 52T. The prism portion 52U is provided between the string side surfaces 52V and 52W. In the front-rear direction, a length of the prism portion 52U is smaller than lengths of the arcuate portions 52A and 52B. The through hole 52S is provided at a center of the prism portion 52U in a front view. In a direction parallel to an extending direction of the strings of the arcuate portions 52A and 52B (left-right direction in FIG. 6, hereinafter, referred to as a "string direction"), a length of the prism portion 52U is smaller than lengths of the strings of the arcuate portions 52A and 52B. That is, the prism portion 52U is located inside the virtual column C in the front view. At the rear end of the cylindrical portion 52T, grooves 52E and 52F recessed forward are formed outside a connection portion with the prism portion 52U in the string direction.

The plate-shaped protruding portions 52M and 52P extend rearward from both end portions of a rear surface of the prism portion 52U in the string direction, respectively. Rear ends of the protruding portions 52M and 52P are located forward of rear ends of the arcuate portions 52A and 52B, respectively. Each of the protruding portions 52M and 52P extends in a direction orthogonal to the string direction in the front view, and one end of each of the protruding portions 52M and 52P is connected to the string of the arcuate portion 52A, and the other end of each of the protruding portions 52M and 52P is connected to the string of the arcuate portion 52B. Hereinafter, a space surrounded by radially inner surfaces of the protruding portions 52M and 52P, the string side surfaces 52V and 52W, and the rear surface of the prism portion 52U is referred to as a "cavity 52R". The bearing 4D and the retaining ring 4F are fitted into the cavity 52R in this order from behind. Hereinafter, the protruding portion 52M and one end portion of the prism portion 52U in the string direction that is continuous with the protruding portion 52M are collectively referred to as an "end portion 52C". The protruding portion 52P and the other end portion of the prism portion 52U in the string direction that is continuous with the protruding portion 52P are collectively referred to as an "end portion 52D".

Support members 70A and 70B are provided on the end portions 52C and 52D, respectively. The support members 70A and 70B are each a plate spring made of metal and having elasticity. The support members 70A and 70B are elastically deformable in the radial direction of the central rotational body 52. By the elastic deformation of the support members 70A and 70B, a part of each of the support members 70A and 70B can move outward and inward with respect to a side surface of the virtual column C. In a case where a part of each of the support members 70A and 70B is outside the side surface of the virtual column C, a wall surface of the through hole 20B through which the rotational body 5 is inserted (that is, an inner wall of the spool 20A) is in contact with the part of each of the support members 70A and 70B. The support members 70A and 70B support the ribbon roll 20 by the contact. In a case where a part of each of the support members 70A and 70B is inside the side surface of the virtual column C, the wall surface of the through hole 20B through which the rotational body 5 is inserted is separated from the part of each of the support members 70A and 70B. The support members 70A and 70B release the support of the ribbon roll 20 by the separation. Hereinafter, a state where a part of each of the support members 70A and 70B is outside the side surface of the virtual column C is referred to as a "support state", and a state where a part of each of the support members 70A and 70B is inside the side surface of the virtual column C is referred to as a "separation state".

The support member 70A includes a support portion 71A, a bent portion 72A, a contact portion 73A, and an inducing portion 74A. The support portion 71A extends in the front-rear direction while being curved in an arc shape protruding outward of the central rotational body 52 in the radial direction. A front end of the support portion 71A is fitted into the groove 52E. In the front-rear direction, a length of the support portion 71A is larger than that of the end portion 52C and smaller than those of the arcuate portions 52A and 52B. That is, a rear end of the support portion 71A is located between a rear end of the end portion 52C and the rear ends of the arcuate portions 52A and 52B in the front-rear direction.

The bent portion 72A extends inward in the radial direction from the rear end of the support portion 71A. An inner end portion of the bent portion 72A in the radial direction is disposed on an inner side in the radial direction with respect to the protruding portion 52M. The contact portion 73A extends forward from the inner end portion of the bent portion 72A in the radial direction. The inducing portion 74A extends forward from a front end of the contact portion 73A and outward of the central rotational body 52 in the radial direction. A front end of the inducing portion 74A is disposed on a front side with respect to the rear end of the protruding portion 52M. Therefore, the support member 70A does not fall off from the central rotational body 52 due to movement in the radial direction. The front end of the support portion 71A is fitted into the groove 52E, and a front surface of the rear rotational body 53, which will be described later, limits rearward movement of the support member 70A, and thus the support member 70A does not fall off from the central rotational body 52 due to movement in the front-rear direction.

The support member 70B has the same configuration as the support member 70A, and is disposed to be symmetrical to the support member 70A with respect to the through hole 52S. The support member 70B includes a support portion 71B, a bent portion 72B, a contact portion 73B, and an inducing portion 74B. The support portion 71B, the bent portion 72B, the contact portion 73B, and the inducing portion 74B correspond to the support portion 71A, the bent portion 72A, the contact portion 73A, and the inducing portion 74A, respectively. A front end of the support portion 71B is fitted into the groove 52F. The support members 70A and 70B bias the contact portions 73A and 73B, respectively, to move inward in the radial direction in a state where the shaft 4 is not inserted through the rotational body 5.

As shown in FIGS. 5A, 5B, 8A, and 8B, the rear rotational body 53 is provided at a rear end of the central rotational body 52. The rear rotational body 53 has a substantially columnar shape and extends in the front-rear direction. A hole 53B recessed forward is provided at a center of a rear surface 53A of the rear rotational body 53. A diameter of the hole 53B is larger than a diameter of the column 6. A hole 53D recessed rearward is provided at a center of the front surface of the rear rotational body 53. A diameter of the hole 53D is substantially equal to the diameter of the hole 53B. A through hole 53M penetrating in the front-rear direction is provided at centers of bottom surfaces of the hole 53B and the hole 53D. The through hole 53M has a circular cross-sectional shape. A diameter of the through hole 53M is substantially equal to the diameter of the rear protruding portion 45 and is smaller than the diameter of the column 6. The rear protruding portion 45 is inserted through the through hole 53M. An axis of the through hole 53M coincides with the axis of the through hole 52S of the central rotational body 52. The rear rotational body 53 is rotatable around the axis of the through hole 53M.

Through holes 53G, 53H, 52J, and 52K penetrating the rear rotational body 53 in the front-rear direction are further provided in the rear surface 53A of the rear rotational body 53. The through holes 53G, 53H, 53J, and 53K are arranged in a peripheral direction of the rear rotational body 53. The through holes 53G and 53H are provided at positions corresponding to the holes 52G and 52H of the central rotational body 52, respectively. The through holes 53G and 53H are rotationally symmetric with respect to the rotation center 4X. The through holes 53J and 53K are provided at positions corresponding to the through holes 52J and 52K of the central rotational body 52, respectively. The through holes 53J and 53K are rotationally symmetric with respect to the rotation center 4X.

Diameters of the through holes 53G and 53H are substantially equal to diameters of the holes 52G and 52H, respectively. The engaging rods 8A and 8B protruding rearward from the rear surfaces of the arcuate portions 52A and 52B of the central rotational body 52 are inserted through the through holes 53G and 53H, respectively. The engaging rods 8A and 8B inserted through the through holes 53G and 53H, respectively, protrude rearward from the rear surface 53A of the rear rotational body 53.

The through holes 53G and 53H are provided with slits 53C penetrating from the corresponding through holes 53G and 53H to the holes 53B and 53D and the through hole 53M in the radial direction, respectively. The slits 53C extend in the front-rear direction from the front end of the rear rotational body 53 to the vicinity of the rear end of the rear rotational body 53. In the peripheral direction of the rear rotational body 53, widths of the slits 53C are substantially equal to diameters of the protrusions 83A and 83B of the respective engaging rods 8A and 8B, respectively. In a state where the engaging rods 8A and 8B are inserted through the through holes 53G and 53H, respectively, the protrusions 83A and 83B protrude from the slits 53C inward of the rear rotational body 53 in the radial direction, respectively.

Each of the through holes 53J and 53K is a stepped hole including a large diameter portion and a small diameter portion. The large diameter portions of the through holes 53J and 53K are provided on rear sides of the through holes 53J and 53K, respectively, and the small diameter portions of the through holes 53J and 53K are provided on front sides of the through holes 53J and 53K, respectively. Bolts 54A and 54B are inserted through the through holes 53J and 53K, respectively. The bolts 54A and 54B include head portions 55A and 55B and screw portions 56A and 56B each formed with a screw groove, respectively. Diameters of the large diameter portions of the through holes 53J and 53K are substantially equal to diameters of the head portions 55A and 55B of the bolts 54A and 54B, respectively. Diameters of the small diameter portions of the through holes 53J and 53K are substantially equal to diameters of the screw portions 56A and 56B of the bolts 54A and 54B, respectively. The head portions 55A and 55B of the bolts 54A and 54B inserted through the respective through holes 53J and 53K are locked at front ends of the large diameter portions of the through holes 53J and 53K, respectively.

The bolts 54A and 54B inserted through the through holes 53J and 53K of the rear rotational body 53 are screwed into the nuts 58A and 58B embedded in the front rotational body 51, respectively, with the screw portions 56A and 56B inserted through the respective through holes 52J and 52K of the central rotational body 52. Accordingly, the front rotational body 51, the central rotational body 52, and the rear rotational body 53 are integrated. The axes of the through hole 51F of the front rotational body 51, the through hole 52S of the central rotational body 52, and the through hole 53M of the rear rotational body 53 through which the shaft 4 is inserted coincide with each other. The integrated rotational body 5 is rotatable around the shaft 4. A rotation center in a case where the rotational body 5 rotates in a state where the shaft 4 is inserted through the rotational body 5 is referred to as a "rotation center 5X". The rotation center 4X coincides with the rotation center 5X.

<Washer Portion 7G>

As shown in FIG. 8A, the washer portion 7G is provided between the plate 9B and the nut 7A such that the insertion portion 41 of the shaft 4 is inserted through the washer portion 7G. In the washer portion 7G, the flat washers 7B, 7E, and 7F are made of resin, and the wave spring washers 7C and 7D are made of metal. The flat washer 7B is pressed against the rear surface of the nut 7A with a biasing force of the wave spring washer 7C. The flat washers 7E and 7F are pressed against the front surface of the plate 9B with a biasing force of the wave spring washer 7D. A rear surface of the wave spring washer 7C and a front surface of the wave spring washer 7D are pressed against each other with mutual biasing forces of the wave spring washers 7C and 7D.

In a case where the shaft 4 rotates around the rotation center 4X, a frictional force is generated between the wave spring washer 7C that biases the nut 7A to rotate integrally with the shaft 4 and the wave spring washer 7D that biases the front surface of the plate 9B. Accordingly, the shaft 4 receives an appropriate force not to rotate too much with respect to the plate 9B, and the rotation is restricted.

<Attachment of Rotational Body 5>

As shown in FIG. 8A, the rotational body 5 is attached to the shaft 4 that is in a state of being pivotally supported on the plate 9B with the nut 7A and the washer portion 7G. The central protruding portion 44 of the shaft 4 is inserted through the bearing 4D and the retaining ring 4F. The rotational body 5 is inserted from a rear side of the shaft 4. The bearing 4C fitted to the rotational body 5 receives the front protruding portion 43 of the shaft 4. In a state where a front end of the bearing 4C is in contact with a rear surface of the shaft wall portion 42 of the shaft 4, a rear end of the rear protruding portion 45 of the shaft 4 is disposed on a rear side than the bottom surface of the hole 53B of the rotational body 5. Hereinafter, a position, shown in FIGS. 8A, 8B, 9A, and 9B, at which a front surface of the bearing 4C comes into contact with the rear surface of the shaft wall portion 42 is referred to as a "first position". The rear end of the rear protruding portion 45 protruding rearward from the bottom surface of the hole 53B is fitted to the groove 65A of the column 6. The screw portion 3B of the bolt 3 is inserted through the through hole 64 of the column 6 and screwed into the hole 45A of the rear protruding portion 45, and thus the column 6 is fixed to the shaft 4.

A diameter of the front surface 62 of the column 6 is larger than the diameter of the through hole 53M. The diameter of the shaft wall portion 42 is larger than a diameter of the inner ring 46 of the bearing 4C. Hereinafter, a position, shown in FIGS. 10A and 10B, at which the bottom surface of the hole 53B comes into contact with the front surface of the column 6 is referred to as a "second position". The second position is a position separated from the plate 9B than the first position. The rotational body 5 is movable in the front-rear direction along the shaft 4 between the first position and the second position.

In a case where the rotational body 5 is located at the first position, the bearing 4D is located in the vicinity of the rear end of the central rotational body 52 in the front-rear direction. In this case, the contact portions 73A and 73B of the respective support members 70A and 70B are in contact with an outer ring 49 of the bearing 4D from the outside in the radial direction. The outer ring 49 has a cylindrical shape extending in the front-rear direction. A diameter of the outer ring 49 is larger than a diameter of the inner ring 48. In a state where the contact portions 73A and 73B are in contact with the outer ring 49, a part of each of the support portions 71A and 71B of the respective support members 70A and 70B is disposed outside the side surface of the virtual column C, and the support members 70A and 70B are in a support state (see FIGS. 8A, 8B, 10A, and 10B). That is, the ribbon roll 20 is supported by the support members 70A and 70B in a state where the rotational body 5 is located at the first position. The bearing 4D receives the central protruding portion 44 of the shaft 4. The rotational body 5 can be smoothly rotated with respect to the shaft 4 by the bearings 4C and 4D.

<Removal of Ribbon Roll 20>

The removal of the ribbon roll 20 in the cassette 1B will be described with reference to FIGS. 8A to 10B. It is assumed that the ribbon roll 20 is supported by the shafts 32A and 32D in a state where the shafts 32A and 32D are inserted through the respective ribbon rolls 20. The description of the shaft 32D having the same configuration as the shaft 32A will be omitted. From a state where the cassette 1B is mounted on the printing device 1A (see FIGS. 8A and 8B), the cassette 1B is pulled forward from the printing device 1A (see FIGS. 9A and 9B).

In a state where the cassette 1B is pulled out from the printing device 1A, the rotational body 5 is at the first position, and the support members 70A and 70B are in the support state. The ribbon roll 20 is supported by the rotational body 5 via the support members 70A and 70B. A user moves the rotational body 5 supporting the ribbon roll 20 along the shaft 4 in a direction away from the plate 9B (rearward). Hereinafter, a direction in which the rotational body 5 moves in a case where the ribbon roll 20 is removed is defined as a "moving direction 5Z (see FIG. 10A)". The support members 70A and 70B move rearward along the shaft 4 together with the rotational body 5, and the contact portions 73A and 73B of the respective support members 70A and 70B slide on an outer surface of the outer ring 49 of the bearing 4D, that is, an outer surface of the bearing portion 4E.

In a case where the rotational body 5 is further separated from the plate 9B, the contact portions 73A and 73B are separated from the bearing portion 4E. The inducing portions 74A and 74B on the respective front sides of the contact portions 73A and 73B come into contact with the outer surface of the bearing portion 4E from the outside in the radial direction with biasing forces of the support members 70A and 70B. As the rotational body 5 moves rearward, the inducing portions 74A and 74B slide while being in contact with the outer surface of the bearing portion 4E. Therefore, the rear ends of the support portions 71A and 71B of the respective support members 70A and 70B move inward in the radial direction in conjunction with the movement of the rotational body 5 in the moving direction 5Z. The support portions 71A and 71B are separated from the wall surface of the through hole 20B.

As shown in FIGS. 10A and 10B, in a case where the rotational body 5 is further separated from the plate 9B and moved to the second position, the inducing portions 74A and 74B are separated from the bearing portion 4E and moved toward a rear protruding portion 45 side. The support members 70A and 70B are further moved inward in the radial direction with own biasing forces. The rear end portions of the support portions 71A and 71B come into contact with front ends of the end portions 52C and 52D from the outside in the radial direction, respectively, and the inward movement in the radial direction is stopped. The contact portions 73A and 73B are disposed at positions closer to the rear protruding portion 45, and the front ends of the inducing portions 74A and 74B are disposed at positions outside the bearing portion 4E in the radial direction. The support portions 71A and 71B are entirely located inside the virtual column C, and the support members 70A and 70B are in the separation state.

The user moves the ribbon roll 20 in the direction away from the plate 9B in a state where the support of the ribbon roll 20 by the support members 70A and 70B is released. The ribbon roll 20 is removed from the rotational body 5. The direction in which the ribbon roll 20 is removed is defined as a "moving direction 2Z". The moving direction 5Z of the rotational body 5 coincides with the moving direction 2Z of the ribbon roll 20.

<Attachment of Ribbon Roll 20>

It is assumed that the cassette 1B is not mounted on the printing device 1A, the ribbon rolls 20 are not inserted through the shafts 32A and 32D, and the rotational body 5 is located at the first position. The description of the shaft 32D having the same configuration as the shaft 32A will be omitted. Since the rotational body 5 is located at the first position, the support members 70A and 70B are in the support state. The user inserts the ribbon roll 20 into the rotational body 5 from a rear side of the shaft 32A. The support members 70A and 70B are in the support state, and thus are in contact with the wall surface of the through hole 20B. The support members 70A and 70B are each the plate spring that is elastically deformable in the radial direction of the rotational body 5, and thus in a case where the user presses the ribbon roll 20 further forward, the ribbon roll 20 moves to a front side of the rotational body 5 while sliding on the support members 70A and 70B. The ribbon roll 20 comes into contact with a rear surface of the flange 51A of the front rotational body 51, and is attached to the rotational body 5. At this time, the ribbon roll 20 is supported by the support members 70A and 70B.

<Overview of Operations of Shaft 32A and 32D>

An overview of operations of the shafts 32A and 32D in a case where the cassette 1B is not mounted on the printing device 1A will be described. It is assumed that the respective ribbon rolls 20 are inserted through the shafts 32A and 32D. The description of the shaft 32D having the same configuration as the shaft 32A will be omitted.

The protrusions 83A and 83B of the respective engaging rods 8A and 8B of the shaft 32A come into contact with a rear end of the groove 66 of the column 6 with biasing forces of the coil springs 84A and 84B (not shown). Therefore, the rotational body 5 is rotatable together with the shaft 4 to which the column 6 is fixed. The shaft 4 receives a frictional force, that is, a braking force, and thus the rotational body 5 also receives an appropriate force not to rotate too much with respect to the shaft 4, and the rotation of the rotational body 5 is reduced. The force received by the rotational body 5 applies an appropriate back tension to the ink ribbon 2 in a case where the user draws the ink ribbon 2 around the rotational body 5. Therefore, the user can easily perform a drawing operation of the ink ribbon 2.

An overview of operations of the shafts 32A and 32D in a case where the cassette 1B is mounted on the printing device 1A will be described. It is assumed that the respective ribbon rolls 20 are inserted through the shafts 32A and 32D, and the rotational body 5 is located at the second position. Since the rotational body 5 is at the second position, the support members 70A and 70B are in the separation state.

Figure 11:
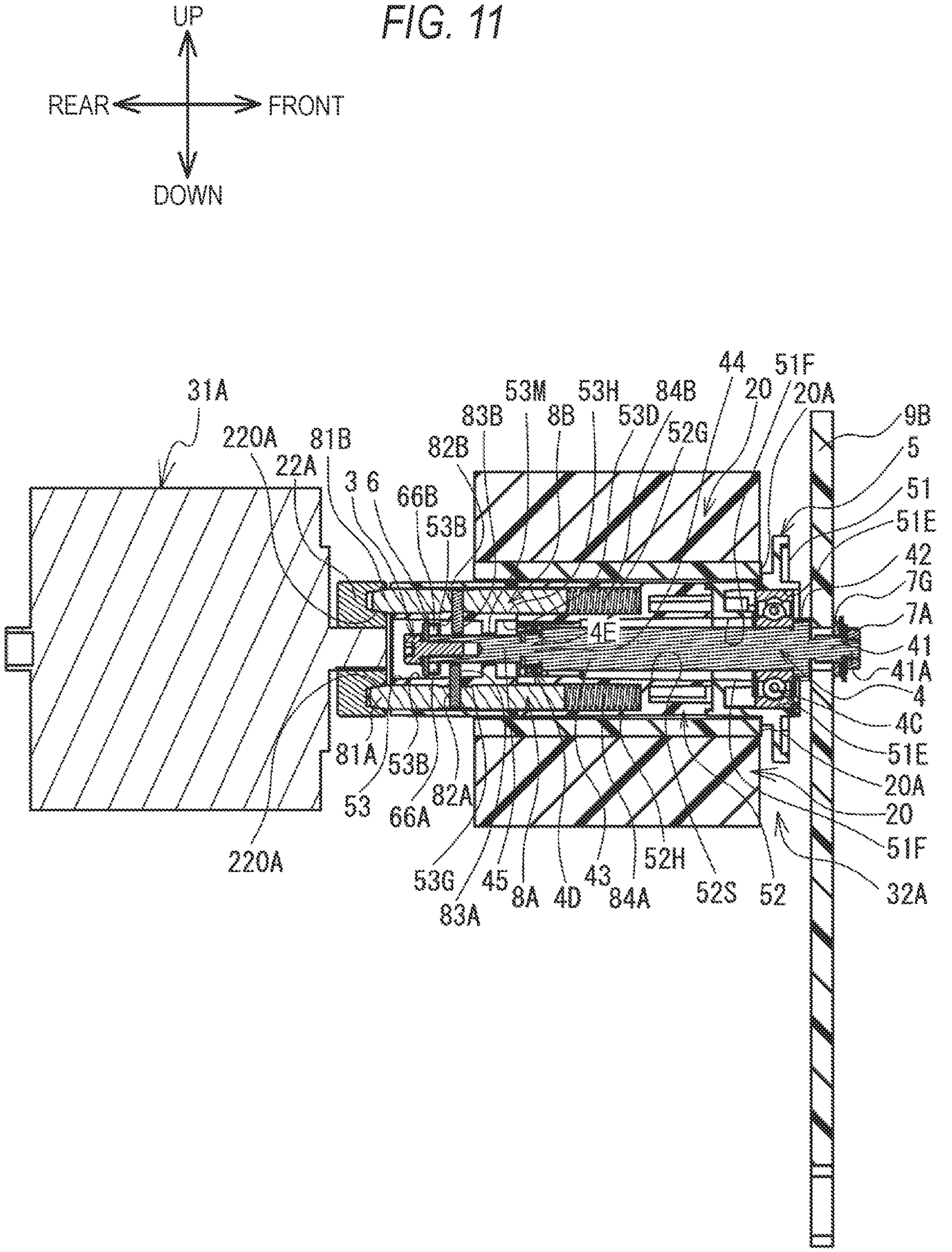
FIG. 11 is another cross-sectional view of the shaft 32A in a state where the cassette 1B is mounted on the printing device 1A.

As shown in FIGS. 8A, 8B, and 11, the tip end portions 81A and 81B of the respective engaging rods 8A and 8B of the shaft 32A are fitted into the holes 220A of the mounting portion 22A of the printing device 1A. In a case where the user presses the cassette 1B toward the printing device 1A, the coil springs 84A and 84B bias the rotational body 5 forward. The rotational body 5 biased by the coil springs 84A and 84B is guided by the shaft 4 and moves in a direction closer to the plate 9B (forward) from the second position toward the first position. As the rotational body 5 moves forward, the inducing portions 74A and 74B of the respective support members 70A and 70B slide while being in contact with the outer surface of the bearing portion 4E. Therefore, the rear ends of the support portions 71A and 71B of the respective support members 70A and 70B are pressed up outward in the radial direction.

In a state where the rotational body 5 is further separated from the plate 9B and moves to the first position, the contact portions 73A and 73B come into contact with the outer surface of the bearing portion 4E, and a part of each of the support portions 71A and 71B of the respective support members 70A and 70B is disposed outside the side surface of the virtual column C. The support portions 71A and 71B come into contact with the wall surface of the through hole 20B, and the support members 70A and 70B are in the support state to support the ribbon roll 20.

In a case where the user further presses the cassette 1B toward the printing device 1A in a state where the rotational body 5 is at the first position, the engaging rods 8A and 8B move forward with respect to the rear rotational body 53 against the biasing forces of the coil springs 84A and 84B. At this time, the protrusions 83A and 83B move forward together with the engaging rods 8A and 8B and are separated from the column 6. The protrusions 83A and 83B are not disposed in the groove 66 of the column 6, and the rotational body 5 is rotatable independently from the shaft 4. Therefore, the rotational body 5 is easily rotatable with respect to the shaft 4 with the bearings 4C and 4D receiving the shaft 4. The rotational body 5 rotates in accordance with the rotation of the motor 31A of the printing device 1A.

<Main Operations and Effects of the Present Embodiment>

The cassette 1B includes the plate 9B, the shaft 4, the rotational body 5, and the support members 70A and 70B. The shaft 4 protrudes rearward from the rear surface of the plate 9B. The shaft 4 is inserted through the rotational body 5. The rotational body 5 is inserted through the ribbon roll 20 around which the ink ribbon 2 is wound. The rotational body 5 is rotatable around the shaft 4. The rotational body 5 is movable in the front-rear direction along the shaft 4 between the first position and the second position separated from the plate 9B with respect to the first position. The support members 70A and 70B are provided on the rotational body 5. The support members 70A and 70B are movable in the radial direction of the shaft 4 in accordance with the movement of the rotational body 5 in the front-rear direction. In a case where the rotational body 5 is at the first position, a part of each of the support members 70A and 70B moves to the outside of the side surface of the virtual column C circumscribing the rotational body 5. The support members 70A and 70B come into contact with the ribbon roll 20 from the inside to be in the support state for supporting the ribbon roll 20. In a case where the rotational body 5 is at the second position, the entirety of the support members 70A and 70B moves to the inside of the side surface of the virtual column C. The support members 70A and 70B are separated from the ribbon roll 20 to be in the separation state where the support is released. In this way, by moving the rotational body 5 in the direction away from the plate 9B, the support of the ribbon roll 20 by the support members 70A and 70B is released. The ribbon roll 20 is moved in the direction away from the plate 9B and removed from the rotational body 5. The moving direction 5Z of the rotational body 5 for releasing the support of the ribbon roll 20 by the support members 70A and 70B coincides with the moving direction 2Z in which the ribbon roll 20 released from the support by the support members 70A and 70B is removed. Therefore, the ink ribbon 2 supported by the cassette 1B can be removed with a simpler operation.

The shaft 4 includes the bearing portion 4E and the rear protruding portion 45. The rear protruding portion 45 is provided at a rear end of the bearing portion 4E. The diameter of the rear protruding portion 45 is smaller than the diameter of the bearing portion 4E. The support members 70A and 70B include contact portions 73A and 73B, respectively. The contact portions 73A and 73B are in contact with the outer surface of the bearing portion 4E in the support state. The contact portions 73A and 73B move toward the rear protruding portion 45 side while sliding on the outer surface of the bearing portion 4E in the separation state. The contact portions 73A and 73B move inward in the radial direction. In this way, the contact portions 73A and 73B come into contact with the bearing portion 4E from the outside in the radial direction, and thus the support members 70A and 70B in the support state support the ribbon roll 20. In a case where the support members 70A and 70B are switched from the support state to the separation state, the contact portions 73A and 73B move toward the rear protruding portion 45 side while sliding on the outer surface of the bearing portion 4E. The contact portions 73A and 73B move inward in the radial direction, and thus the support of the ribbon roll 20 is released. Therefore, the cassette 1B can support the ink ribbon 2 and release the support with a simple configuration.

The cassette 1B includes the coil springs 84A and 84B. The coil springs 84A and 84B are provided on the rotational body 5. In a case where the cassette 1B is mounted on the printing device 1A, the coil springs 84A and 84B are compressed by the engaging rods 8A and 8B provided behind the coil springs 84A and 84B, respectively, and bias the rotational body 5 at the second position to move to the first position. In this way, the rotational body 5 at the second position is biased by the coil springs 84A and 84B and moves to the first position, and the support members 70A and 70B are in the support state. In a case where the cassette 1B is mounted on the printing device 1A in a state where the rotational body 5 is not located at the first position, the ribbon roll 20 is rotatable with respect to the rotational body 5, and the rotation of the ribbon roll 20 is not synchronized with the rotation of the motor 31A of the printing device 1A. In this case, printing is not accurately performed at a position desired by the user. The rotational body 5 is disposed at the first position in a state where the cassette 1B is mounted on the printing device 1A with the coil springs 84A and 84B. Therefore, the printing device on which the cassette 1B is mounted can accurately perform printing.

The support members 70A and 70B are each the plate spring made of metal and having elasticity. In this case, in a case where the support members 70A and 70B are in the support state in a state where the cassette 1B is not mounted on the printing device 1A, the user inserts the ribbon roll 20 into the rotational body 5 from behind, and thus the ribbon roll 20 is supported. Therefore, the ink ribbon 2 can be supported by the cassette 1B with a simpler operation.

The printing device 1A includes the mounting portion 22, the motors 31A and 31B, and the thermal head 26. The cassette 1B is mounted on the mounting portion 22. The mounting portions 22A and 22D have the holes 220A and the holes 220D into which the respective engaging rods 8A to 8D of the cassette 1B are fitted. The rotation shafts of the motors 31A and 31B are connected to the mounting portions 22A and 22D, respectively. In the printing device 1A, the mounting portions 22A and 22D are rotated by the motors 31A and 31B, respectively, and thus the ribbon roll 20 mounted on the rotational body 5 is rotated, and the ink ribbon 2 is conveyed. The thermal head 26 heats the ink ribbon 2 fed out from the cassette 1B in accordance with the rotation of the rotational body 5, and performs printing. In this case, the ink ribbon 2 can be removed from the cassette 1B with a simpler operation, and thus the user can more easily replace the ink ribbon 2 supported by the cassette 1B in a case where the printing is performed by the printing device 1A.

At the time of removing the ribbon roll 20 from the cassette 1B, the user moves the rotational body 5 in the direction away from the plate 9B. The support members 70A and 70B move inward in the radial direction to switch from the support state to the separation state, and the support of the ribbon roll 20 is released. The user removes the ribbon roll 20 from the cassette 1B by moving the ribbon roll 20 in the direction away from the plate 9B in a state where the support by the support members 70A and 70B is released. In this way, the user moves the rotational body 5 in the direction away from the plate 9B, and thus the support of the ribbon roll 20 by the support members 70A and 70B is released. The moving direction 5Z of the rotational body 5 for releasing the support of the ink ribbon by the support members 70A and 70B coincides with the moving direction 2Z in which the ribbon roll 20 released from the support by the support members 70A and 70B is removed. Therefore, the ink ribbon supported by the ink ribbon support cassette can be removed with a simpler operation.

The present disclosure is not limited to the embodiment described above, and various modifications may be made without departing from the gist of the present disclosure. For example, the following modifications may be made as appropriate. The following modifications may be combined as appropriate.

The front rotational body 51, the central rotational body 52, and the rear rotational body 53 of the rotational body 5 may not be integrally moved in the front-rear direction. For example, the front rotational body 51 and the central rotational body 52 may not come into contact with or separate from the plate 9B, and only the rear rotational body 53 may move along the shaft 4. In this case, for example, the support member may be provided on the central rotational body 52, extends toward the rear side while being curved in an arc shape protruding outward of the central rotational body 52 in the radial direction, has a length in the front-rear direction larger than those of the arcuate portions 52A and 52B, has one end fitted into the grooves 52E and 52F, and has the other end as a free end. In a case where the front rotational body 51 and the central rotational body 52 are close to the rear rotational body 53, the support member comes into contact with the front surface of the rear rotational body 53, spreads outward in the radial direction, and supports the ribbon roll 20. in a case where the rear rotational body 53 is moved in the direction away from the plate 9B, the support member is separated from the front surface of the rear rotational body 53 and is moved inward in the radial direction to release the support of the ribbon roll 20.

In this case, the rear rotational body 53 is moved in the direction away from the plate 9B, and thus the support of the ribbon roll 20 by the support member provided on the central rotational body 52 is released. Therefore, the ink ribbon 2 supported by the cassette 1B can be removed with a simpler operation. In this case, the central rotational body 52 corresponds to a "first rotational body" in the present disclosure. The rear rotational body 53 corresponds to a "second rotational body" in the present disclosure.

In the present disclosure, various other modifications are possible. The configurations and the numbers of the printing device 1A and the cassette 1B may be changed as appropriate. A direction in which the shaft 4 extends with respect to the plate 9B is not limited to a direction orthogonal to the plate 9B. The shaft 4 may extend in a direction inclined with respect to the direction orthogonal to the plate 9B. The shaft 4 may be fixed to the plate 9B. The shaft 4 may be movable in at least one of the up-down direction, the left-right direction, and the front-rear direction with respect to the plate 9B.

The rotational body 5 may have a shape other than the substantially cylindrical shape. The rotational body 5 may be provided to cover only a part of a periphery of the shaft 4. The rotational body 5 may include a rotational body different from the front rotational body 51, the central rotational body 52, and the rear rotational body 53, or may not include at least one of the front rotational body 51, the central rotational body 52, and the rear rotational body 53.

The configurations and the numbers of the support members 70A and 70B may be changed as appropriate. At least one of the support members 70A and 70B may have plasticity. The support portions 71A and 71B may be located outside the side surface of the virtual column C as long as the support portions 71A and 71B are separated from the wall surface of the through hole 20B in a case where the rotational body 5 is at the second position. The support portions 71A and 71B may not extend in the front-rear direction, and may extend, for example, in the peripheral direction of the central rotational body 52. Rollers may be provided on the contact portions 73A and 73B and the inducing portions 74A and 74B in order to reduce friction caused by sliding with the bearing portion 4E. In addition to the support members 70A and 70B, a support member that does not move in the radial direction in conjunction with the movement of the rotational body 5 may be provided.

Figure 12:
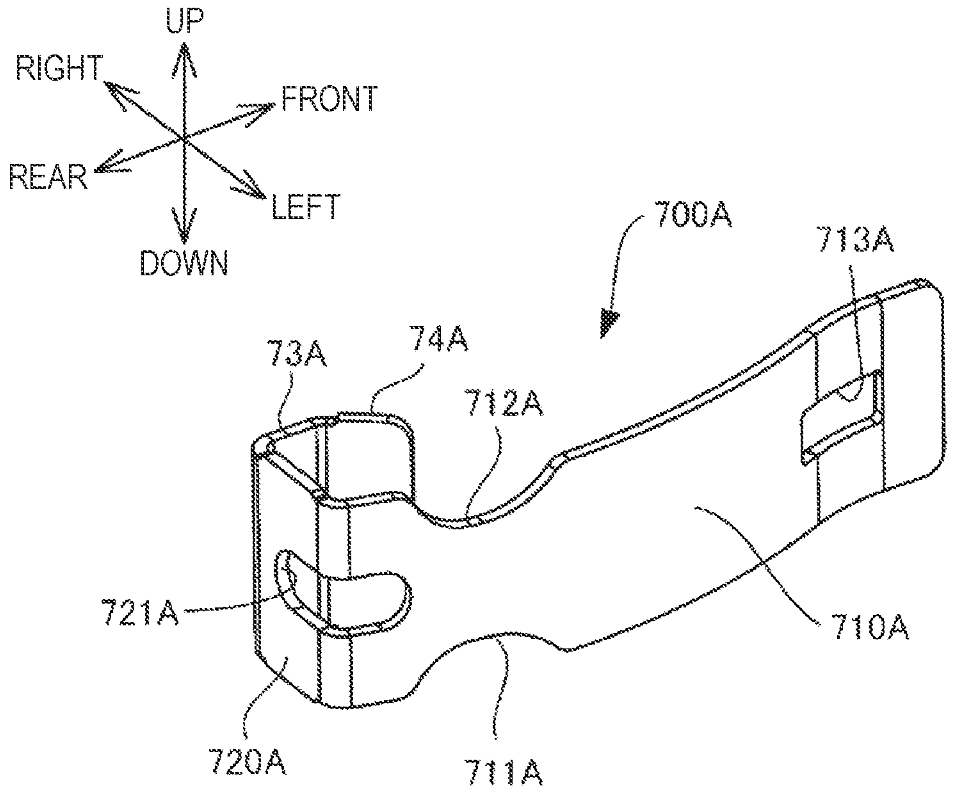
FIG. 12 is a perspective view of a support member 700A.

For example, a support member 700A shown in FIG. 12 may be used instead of the support members 70A and 70B. The support member 700A is a plate spring made of metal and having elasticity. The support member 700A includes a support portion 710A, a bent portion 720A, the contact portion 73A, and the inducing portion 74A. The contact portion 73A and the inducing portion 74A have the same shapes as the contact portion 73A and the inducing portion 74A of the support member 70A, respectively, and thus the description of the contact portion 73A and the inducing portion 74A will be omitted.

The support portion 710A is different from the support portion 71A (see FIG. 5A) in that the support portion 710A includes recesses 711A and 712A, a through hole 713A, and a part of a through hole 721A. Other parts of the support portion 710A have the same shape as those of the support portion 71A, and thus the description thereof will be omitted. The recesses 711A and 712A are located between a center of the support portion 710A and the bent portion 720A in the front-rear direction. The recesses 711A and 712A are portions where the support portion 710A is recessed in the up-down direction. Specifically, the recess 711A is a portion in which a lower edge of the support portion 710A is recessed upward in an arc shape. The recess 712A is a portion in which an upper edge of the support portion 710A is recessed downward in an arc shape. In other words, a width of the support portion 710A in the up-down direction is narrower at positions of the recesses 711A and 712A than at the other parts. The through hole 713A is located between the center of the support portion 710A and a front end of the support portion 710A in the front-rear direction. The through hole 713A is used to position the support portion 710A with respect to the central rotational body 52 by engaging with a protrusion (not shown) provided on the central rotational body 52.

The bent portion 720A is different from the bent portion 72A (see FIG. 5A) in that the bent portion 720A includes the other part of the through hole 721A. Other parts of the bent portion 720A have the same shape as those of the bent portion 72A, and thus the description thereof will be omitted. The through hole 721A extends from a center of the bent portion 72A to a left end in the left-right direction. The through hole 721A extends from a rear end of the support portion 710A to a position between the recesses 711A and 712A and the rear end of the support portion 710A in the front-rear direction. That is, the through hole 721A is present over the support portion 710A and the bent portion 720A. The through hole 721A is provided for the purpose of reducing a load for holding the ribbon roll 20 and reducing stress concentration on the recesses 711A and 712A.

In a case where the support member 700A is in the support state with a configuration shown in FIG. 12, the support portion 710A protrudes leftward in an arc shape. In a case where the support member 700A is in the support state, at least a part of the recesses 711A and 712A is located on a front side with respect to an apex of the support portion 710A protruding in the arc shape. In a case where the support member 700A is in the support state, the recesses 711A and 712A are in contact with the wall surface of the through hole 20B at a portion (that is, a rising portion of the arc) inclined upward toward the rear from the front end of the support portion 710A. In a case where the wall surface of the through hole 20B is scraped due to long-term use, the recesses 711A and 712A scrape the wall surface of the through hole 20B at the rising portion of the arc, and thus the wall surface of the through hole 20B receives a forward force from the support member 700A. Therefore, even in a case where the wall surface of the through hole 20B is scraped due to long-term use, the ribbon roll 20 is prevented from moving rearward.

The shafts 32A and 32D may each include a biasing member (for example, a compression coil spring) that biases the rear rotational body 53 rearward. In this case, in a case where the cassette 1B is removed from the printing device 1A, the rotational body 5 moves in the direction away from the plate 9B and is disposed at the second position without being operated by the user, and the support of the ribbon roll 20 by the support members 70A and 70B is released. The shafts 32A and 32D may each include a biasing member (for example, a tension coil spring) that biases the rear rotational body 53 forward. In this case, in a case where the user removes the ribbon roll 20 from the shaft 32A and ends an operation, the rotational body 5 moves in the direction closer to the plate 9B and is disposed at the first position without being operated by the user, and the support members 70A and 70B are in the support state.

Each of the shafts 32A and 32D may not include at least one of the bearings 4C and 4D. For example, in a case where each of the shafts 32A and 32D does not include the bearing 4D, the contact portions 73A and 73B may be in contact with the central protruding portion 44 from the outside in a state where the support members 70A and 70B are in the support state. The column 6 may be fixed to the shaft 4 by a method other than screwing of the bolt 3. The configuration and the number of the washer portions 7G may be changed as appropriate. For example, each of the shafts 32A and 32D may not include at least one of the flat washers 7B, 7E, and 7F. Other elastic members such as rubber may be used instead of the wave spring washers 7C and 7D. The engaging rods 8A and 8B may not protrude from the rear surface 53A of the rear rotational body 53. In this case, for example, the mounting portion 22A of the printing device 1A may be provided with a protruding portion protruding forward.

What is claimed is:

1. An ink ribbon support cassette capable of being mounted on a printing device configured to perform printing on a printing medium using an ink ribbon, and capable of supporting a ribbon roll having the ink ribbon wound, the ink ribbon support cassette comprising:

a plate;

a shaft extending from the plate;

a rotational body provided to be rotatable around the shaft by driving of a printing device in a state of being mounted on the printing device, and provided to be movable along the shaft between a first position and a second position that is farther separated from the plate, along an axial direction of the shaft, than the first position;

a support member switchable between a support state in which the rotational body is at the first position and where at least a part of the support member is located outward, in a radial direction of the shaft, than an outer surface of the rotational body, and a separation state in which the rotational body is at the second position and where at least the part is located inward in the radial direction than the outer surface of the rotational body, the support member being provided on the rotational body; and a biasing portion configured to bias the rotational body at the second position toward the first position.

2. An ink ribbon support cassette capable of being mounted on a printing device configured to perform printing on a printing medium using an ink ribbon, and capable of supporting a ribbon roll having the ink ribbon wound, the ink ribbon support cassette comprising:

a plate;

a shaft extending from the plate, wherein the shaft includes:

a first shaft portion having a predetermined diameter; and a second shaft portion provided in an axial direction of the shaft with respect to the first shaft portion and having a diameter smaller than that of the first shaft portion;

a rotational body provided to be rotatable around the shaft by driving of a printing device in a state of being mounted on the printing device, and provided to be movable along the shaft between a first position and a second position that is farther separated from the plate, along the axial direction of the shaft, than the first position; and a support member switchable between a support state in which the rotational body is at the first position and where at least a part of the support member is located outward, in a radial direction of the shaft, than an outer surface of the rotational body, and a separation state in which the rotational body is at the second position and where at least the part is located inward in the radial direction than the outer surface of the rotational body, the support member being provided on the rotational body, the support member including:

a contact portion configured to come in contact with the first shaft portion in the support state and come in contact with the second shaft portion in the separation state.

3. The ink ribbon support cassette according to claim 1, wherein the support member is a plate spring elastically deformable in the radial direction.

4. The ink ribbon support cassette according to claim 3, wherein the support member includes:

a support portion extending in the axial direction of the shaft and curved in an arc shape protruding outward in the radial direction; and a bent portion extending inward in the radial direction from one end of the support portion in the axial direction, wherein the one end of the support portion in the axial direction is farther separated from the plate than an other end of the support portion in the axial direction, and wherein the support portion includes:

a recessed portion located between a center of the support portion in the axial direction and the bent portion, and recessed in a direction orthogonal to the axial direction and the radial direction.

5. The ink ribbon support cassette according to claim 1, wherein the shaft includes an engaging rod and a coil spring, wherein an end of the shaft is in contact with an end of the coil spring, in a case where the ink ribbon support cassette is mounted on a printing device, the engaging rod comes into contact with a mounting portion of the printing device, the coil spring is compressed by the engaging rod, and the coil spring biases the rotational body at the second position to move to the first position, and the mounting portion is a portion on which the ink ribbon support cassette is capable of being mounted.

6. The ink ribbon support cassette according to claim 1, wherein the rotational body includes a first rotational body and a second rotational body, the support member is provided on the first rotational body, the second rotational body is movable along the shaft, and the support member moves in the radial direction in accordance with a position of the second rotational body in the axial direction of the shaft.

7. A printing device comprising:

the ink ribbon support cassette according to claim 1;

a mounting portion on which the ink ribbon support cassette is capable of being mounted;

a drive portion capable of rotating the rotational body of the ink ribbon support cassette mounted on the mounting portion; and a thermal head capable of performing printing on a printing medium by heating the ink ribbon.

8. The ink ribbon support cassette according to claim 1, wherein the rotational body includes a flange.

9. A method for removing a ribbon roll from an ink ribbon support cassette, the ink ribbon support cassette including:

a shaft extending from a plate, a rotational body provided to be rotatable around the shaft and provided to be movable along the shaft between a first position and a second position that is farther separated from the plate, along an axial direction of the shaft, than the first position, and configured to be inserted through the ribbon roll having an ink ribbon wound, and a support member provided on the rotational body, the support member being movable in a radial direction of the shaft in accordance with movement of the rotational body in an axial direction of the shaft, the support member being switchable between a support state where at least a part of the support member is in contact with the ribbon roll from inside to support the ribbon roll and where the rotational body is at the first position, and a separation state where at least the part moves inward in the radial direction to be separated from the ribbon roll and where the rotational body is at the second position, and a biasing portion configured to bias the rotational body at the second position toward the first position, the method comprising:

moving the ribbon roll in a direction away from the plate in the axial direction of the shaft to move the rotational body along the shaft together with the support member configured to support the ribbon roll;

switching the support member from the support state to the separation state in conjunction with the movement of the rotational body in the axial direction away from the plate to release support of the ribbon roll; and removing the ribbon roll from the rotational body.

* * * * *